United States Patent [19]

Moritoki et al.

[11] Patent Number: 5,204,865
[45] Date of Patent: Apr. 20, 1993

[54] DATA EXTRACTING CIRCUIT FOR SERIAL CONTROL APPARATUS

[75] Inventors: Masakazu Moritoki; Masao Hagiwara; Makoto Takebe; Yukinori Katayama, all of Kanagawa, Japan

[73] Assignee: Kabushiki Kaisha Komatsu Seisakusho, Tokyo, Japan

[21] Appl. No.: 571,539
[22] PCT Filed: Feb. 28, 1989
[86] PCT No.: PCT/JP89/00208
 § 371 Date: Aug. 9, 1990
 § 102(e) Date: Aug. 9, 1990
[87] PCT Pub. No.: WO89/08361
 PCT Pub. Date: Sep. 8, 1989

[30] Foreign Application Priority Data

Feb. 29, 1988 [JP] Japan .................. 63-44099
Apr. 27, 1988 [JP] Japan .................. 63-104745
Dec. 1, 1988 [JP] Japan .................. 63-304635
Dec. 2, 1988 [JP] Japan .................. 63-305582

[51] Int. Cl.⁵ .................................... G06F 7/02
[52] U.S. Cl. .................................... 371/67.1
[58] Field of Search .............. 371/67.1, 20.6, 5.5, 371/5.1, 4, 29.1

[56] References Cited
U.S. PATENT DOCUMENTS 4,789,986 12/1988 Koizumi et al. ............... 371/67.1
4,914,657 4/1990 Walter et al. .................. 364/200
4,991,174 2/1991 Mon et al. ..................... 371/9.1

OTHER PUBLICATIONS

"A Local Communications Network Based on Inter-connected Token-Access Rings: A Tutorial" by Norman C. Strole, 1983, pp. 119-134.

Primary Examiner—Robert W. Beausoliel, Jr.
Assistant Examiner—Phung My Chung
Attorney, Agent, or Firm—Diller, Ramik & Wight

[57] ABSTRACT

A serial control apparatus includes a main controller (2) and a plurality of nodes (3) each serving as an auxiliary controller normally serially arranged on a loop-shaped signal transmission line (1). Each node (3) extracts data for the present node among from the data delivered from the main controller (2) as time elapses so as to allow the terminal units (A) associated with the present node to be properly controlled. In addition, the node inserts the output data from the terminal units (A) into a time slot corresponding to the present node and then delivers to the signal transmission line (1) the output data which in turn are transferred to the main controller (2) via other nodes on the downstream side. To assure that the data extracting circuit operates properly, two latching circuits, i.e., first and second latching circuits (311, 312 to 315) are serially arranged in a signal passage by way of which the extracted data are fed to a driver (316) for the corresponding terminal units.

7 Claims, 14 Drawing Sheets

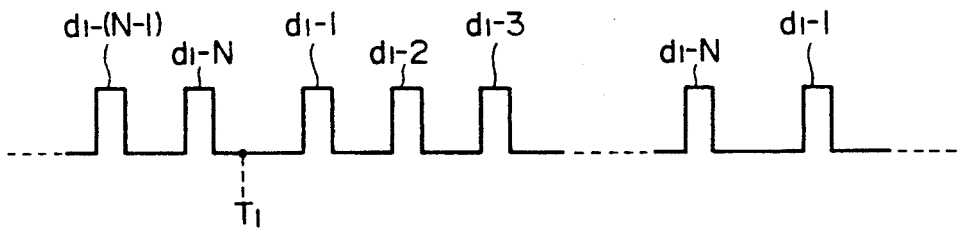
FIG. 8
(a) 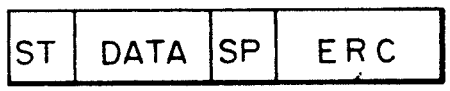
(b) 
(c) 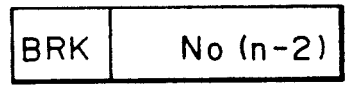
(d) 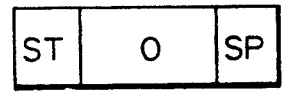
FIG. 9
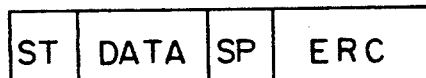
FIG. 11

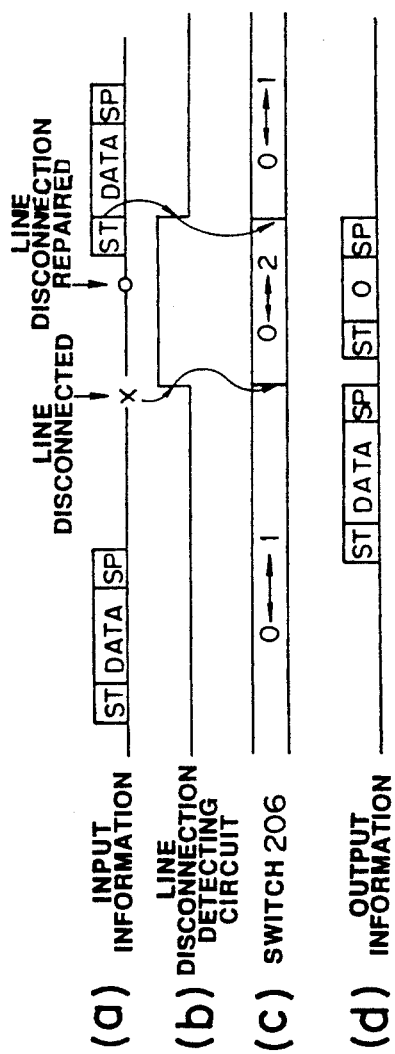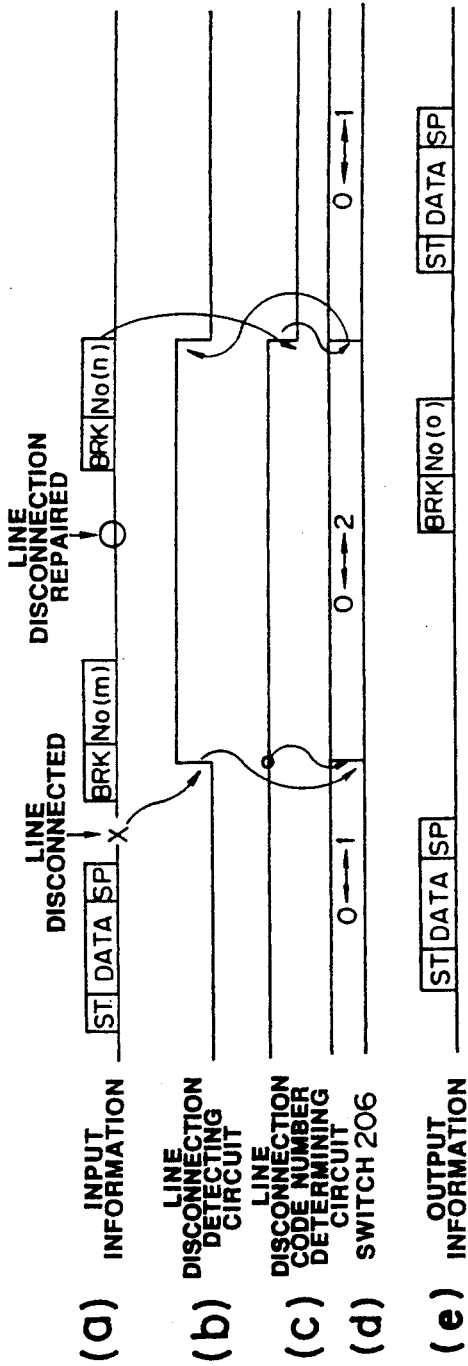

DATA EXTRACTING CIRCUIT FOR SERIAL CONTROL APPARATUS

TECHNICAL FIELD

The present invention relates to a data extracting circuit preferably employable for a serial control apparatus which has been hitherto used for a central control system available for various kinds of machines such as a press, a machine tool, a construction machine, a ship, an aircraft or the like machine as well as a central control system available for an unmanned conveying unit, an unmanned warehouse or the like installation.

BACKGROUND ART

When presses, machine tools, construction machines, ships, aircrafts, unmanned couveying units, unmanned warehouses or the like are to be centrally controlled, a large number of sensors for detecting the present operative state of each section in these machines or installations and a large number of actuators for controlling the present operative state of each section in these machines or installations are required. For example, in the case of a press, the number of required sensors and actuators exceeds 3000. In other case, each machine or installation may need to be equipped with sensors and actuators more than 3000 in number.

Hitherto, the central control system for centrally controlling the foregoing kinds of machines or installations is typically constructed such that a number of sensors and a number of actuators are connected to a main controller so that a number of sensor outputs are collected in the main controller which in turn controls the actuators.

With the conventional central control system as constructed in the above-described manner, as a large number of sensors and actuators are required, the number of connection lines extending between the main controller and the sensors/actuators increases enormously. In addition, an input/output section in the main controller becomes unavoidably complicated in structure.

To obviate the foregoing problem, a proposal has been made such that a plurality of nodes are serially arranged one after another, one or a plurality of sensors and actuators are connected to each node and the nodes are connected to each other via a main controller so that each node is properly controlled in response to a signal outputted from the main controller. With such a structure as described above, the main controller is basically required to have a plurality of signal input lines and a plurality of signal output lines by way of which the main controller is connected to the respective nodes, resulting in the number of wiring lines being reduced substantially.

However, in a case where the central control system is constructed such that the nodes are serially connected to each other, there arises a problem as to how simultaneous collection of outputs from the respective nodes and simultaneous control of the respective actuators are accomplished. For example, in the case of a structure wherein a specific address is allocated to each node to control the latter based on the allocated address, time delay caused by processing a plurality of allocated addresses becomes another problem. Thus, simultaneous collection of outputs from the respective sensors and simultaneous control of the respective actuators cannot be accomplished satisfactorily.

In view of the aforementioned facts, the inventors abandoned the technical concept that a plurality of nodes are serially connected to each other with a specific address allocated to each node. Instead of the foregoing technical concept, the inventors propose a serial control apparatus which is constructed such that each node is distinguished from other node in accordance with an order of node connection. With this proposed serial control apparatus, any address processing is not required and time delay caused by the address processing is eliminated with the result that a node structure can be simplified remarkably.

The proposed serial control apparatus is constructed such that each node successively adds output signals from sensors in the present node to a signal from nodes on the upstream side in compliance with a predetermined rule and signals specifically intended for the present node are successively extracted from among signals transmitted from nodes on the upstream side so that the former signals are outputted to a plurality of actuators associated with the present node. With the serial control apparatus, each node does not require not only any address but also a step of address processing, causing time delay at each node to be reduced to such a very small quantity that merely a timing coincidence is required. Additionally, a node structure is largely simplified.

FIG. 1 is a block diagram which schematically illustrates by way of example the aforementioned serial control apparatus. As is apparent from the drawing, the serial control apparatus includes a main controller 2 and n nods 3 - 1 to 3 - n both of which are arranged along a loop-shaped signal transmission line 1, and each of the nodes 3 - 1 to 3 - n has a plurality of sensors Sl to Si and a plurality of actuators Al to Ak connected thereto.

As shown in FIG. 2(a), the main controller 2 sends a communication information to the signal transmission line, wherein the communication information includes a start code ST at the head end, a control information DATA for each node at the subsequent location, a stop code SP indicative of the end of the control information DATA at the subsequent location and an error check code ERC such as a parity check code, a CRC code or the like at the tail end. The communication information is serially transmitted to the respective nodes 3 - 1 to 3 - n via the signal transmission line 1.

When each of the respective nodes 3 - 1 to 3 - n receives a communication information via the signal transmission line 1, it extracts a control information on a time slot corresponding to a specific connection number allocated to the present node and then controls the actuators Al to Ak in accordance with the control information. Then, each node inserts output signals for the sensors Sl to Si into a time slot associated with the connection number allocated to the present node, and the output signals are transmitted to nodes on the downstream side.

Therefore, when the control information DATA transmitted from the main controller 2 is outputted from the node 3 - n on the ultimate downstream side (see FIG. 2(e)), it is converted into a sensor output signal for each node. In response to the sensor output signal, the main controller detects the present operative state of each of the nodes 3 - 1 to 3 - n. Then, the process goes to a next control step.

Referring to FIG. 2 again, $T_{01}$, $T_{02}$, $T_{11}$, --- represent a signal transmission time of the corresponding signal, respectively. With the illustrated serial control apparatus, it is assumed that transmission of a series of signals S0 to Sn shown in FIG. 2 is repeatedly carried out at a high speed in accordance with the following relationship.

$$T_{01} = T_{11} = T_{21} = T_{31} = T_{n1} \text{ or}$$
$$T_{11} < T_{02}, T_{21} < T_{12}, T_{31} < T_{22}, -$$

When such a serial control apparatus as described above is employed, a signal frame as shown in FIG. 2 is used as a signal to be transmitted through the respective nodes 3 - 1 to 3 - n and moreover the aforementioned protocol is additionally employed for the serial control apparatus. Thus, data receiving/transmitting and error check can certainly and effectively be accomplished with the serial control apparatus. However, in a case where a certain machine is to be controlled with the serial control apparatus via, e.g., a plurality of actuators as mentioned above, there is liable to arise a malfunction that informations are erroneously outputted to the actuator and thereby incorrect operation of the machine to be controlled is induced.

The present invention has been made with the foregoing background in mind and its object resides in providing a data extracting circuit employable for a serial control apparatus which can reliably prevent a plurality of actuators or the like from being erroneously actuated and moreover assures that a machine to be controlled is properly operated with a high reliability.

DISCLOSURE OF THE INVENTION

According to the present invention, e.g., first and second latching means are serially arranged in a signal passage by way of which data extracted from each node are fed to a driver for corresponding terminal units (actuators). In a case where an error or an error history is detected when the data are to be transferred, the data extracting circuit inhibits the data from being latched in the latching means disposed on the driver side, whereby erroneous data or uncertain data are not fed to the driver without fail.

By doing so, at least an erroneous operation of the actuators or the like due to an error during data transmission is prevented.

In addition, according to the present invention, the data extracting circuit determines with a predetermined logic based on plural latching operations performed by the first and second latching means whether data extracted at every data extracting operation are true or false. Further, the data extracting circuit is additionally provided with determining means for permitting only the data which have been determined as true data to be inputted into the driver.

Thus, the data extracting circuit can detect any data error even in the following cases and thereby can realize terminal control with a high reliability: (a) a case where the main controller sends as control data a plurality of data which have been originally erroneous, and (b) a case where one of data in an inputted data row is outputted with a logical content of the data inverted because of incorrect operation performed at each node.

BRIEF DESCRIPTION OF THE DRAWINGS

FIG. 8 is a time chart which illustrates by way of example a data bit signal to be inputted into the collating block.

FIG. 9 is a schematic view which comparatively illustrates a pattern of a normal signal frame and a pattern of a signal frame in the event of line disconnection in conjunction with a data extracting circuit in accordance with another embodiment of the present invention.

FIG. 11 shows a plurality of time charts each of which illustrates by way of example operations to be performed by the data extracting circuit shown in FIG. 10.

FIG. 13 shows a plurality of time charts each of which illustrates by way of example operations to be performed by the data extracting circuit shown in FIG. 12.

FIG. 17 shows a plurality of time charts each of which illustrates by way of example operations to be performed by the data extracting circuit shown in FIG. 14.

BEST MODE FOR CARRYING OUT THE INVENTION

Figure 3:
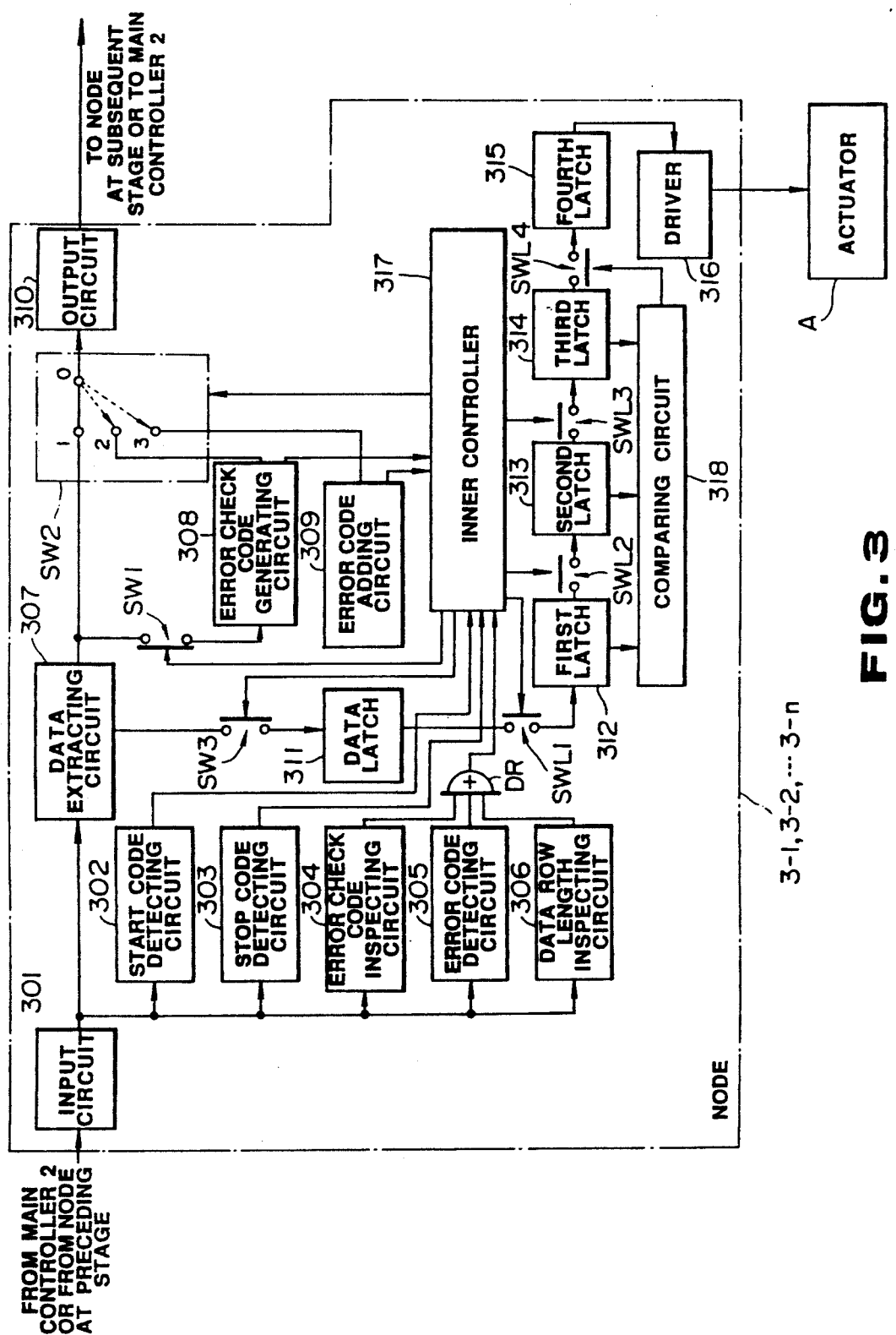
FIG. 3 is a block diagram which schematically illustrates a data extracting circuit in accordance with an embodiment of the present invention.
Figure 4:
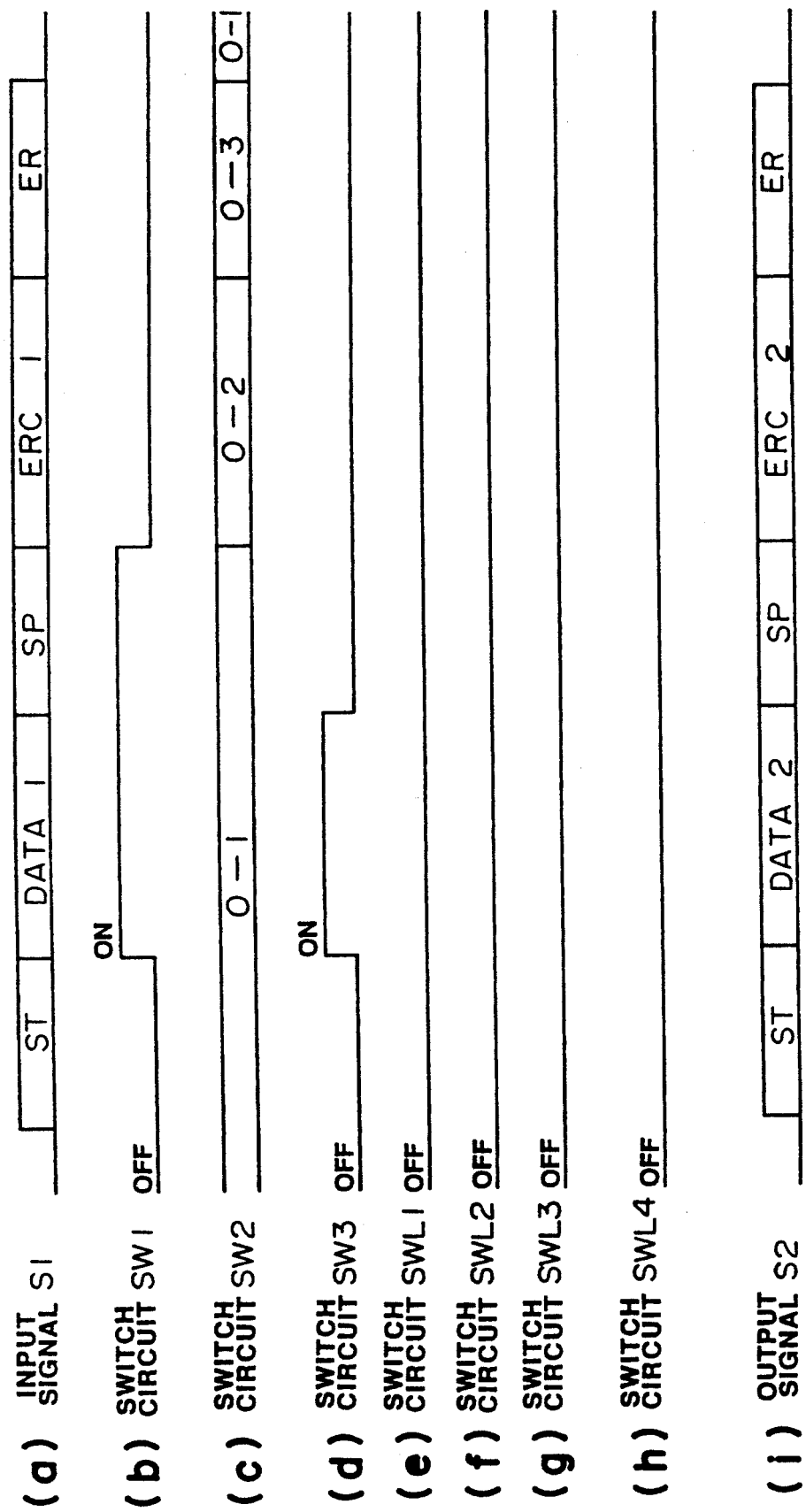
FIG. 4 and FIG. 5 show a plurality of time charts each of which illustrates by way of example operations to be performed by the data extracting circuit shown in FIG. 3, respectively.
Figure 5:
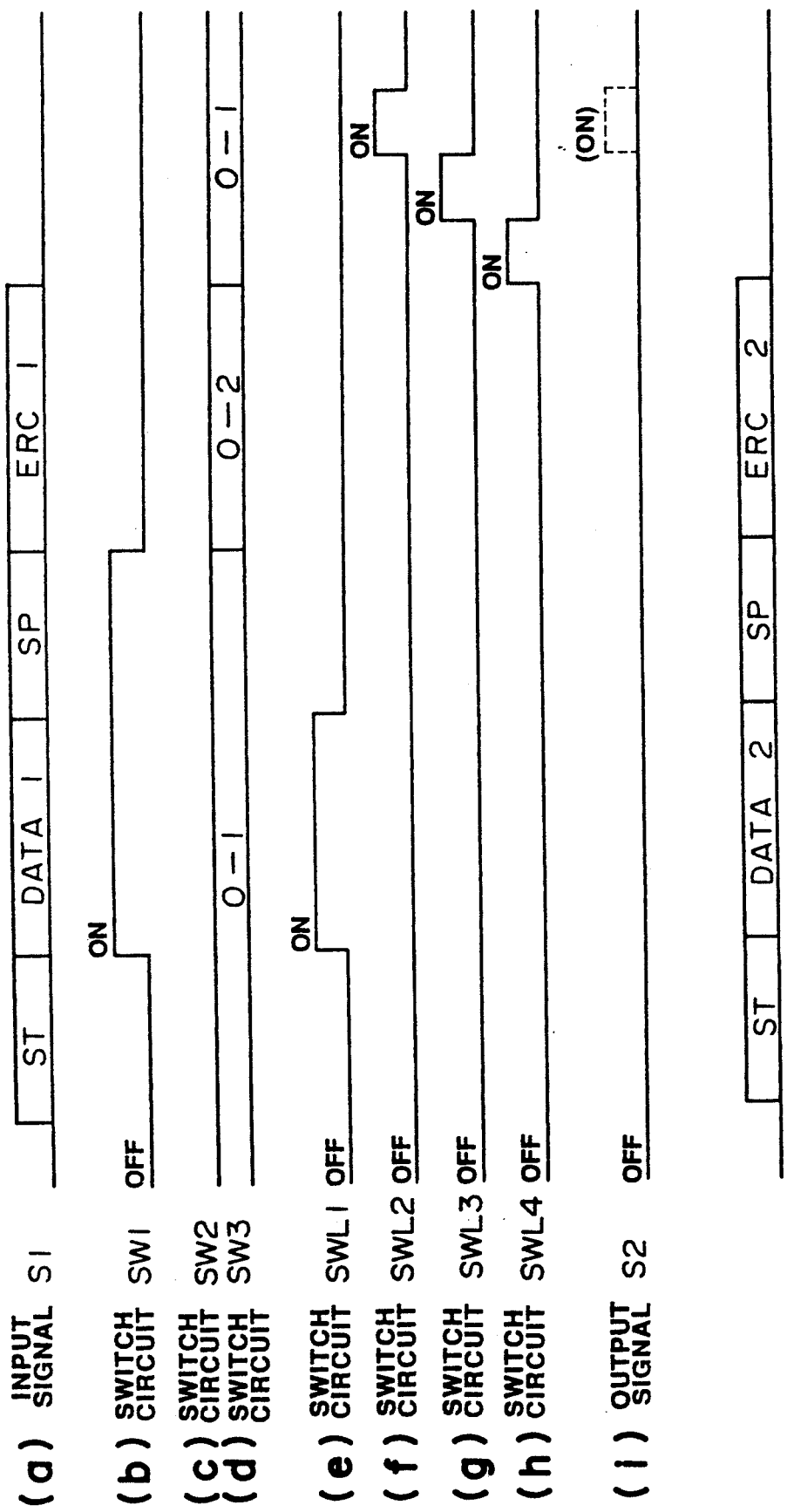

FIGS. 3 to 5 illustrate a data extracting circuit employable for a serial control apparatus in accordance with an embodiment of the present invention.

Figure 1:
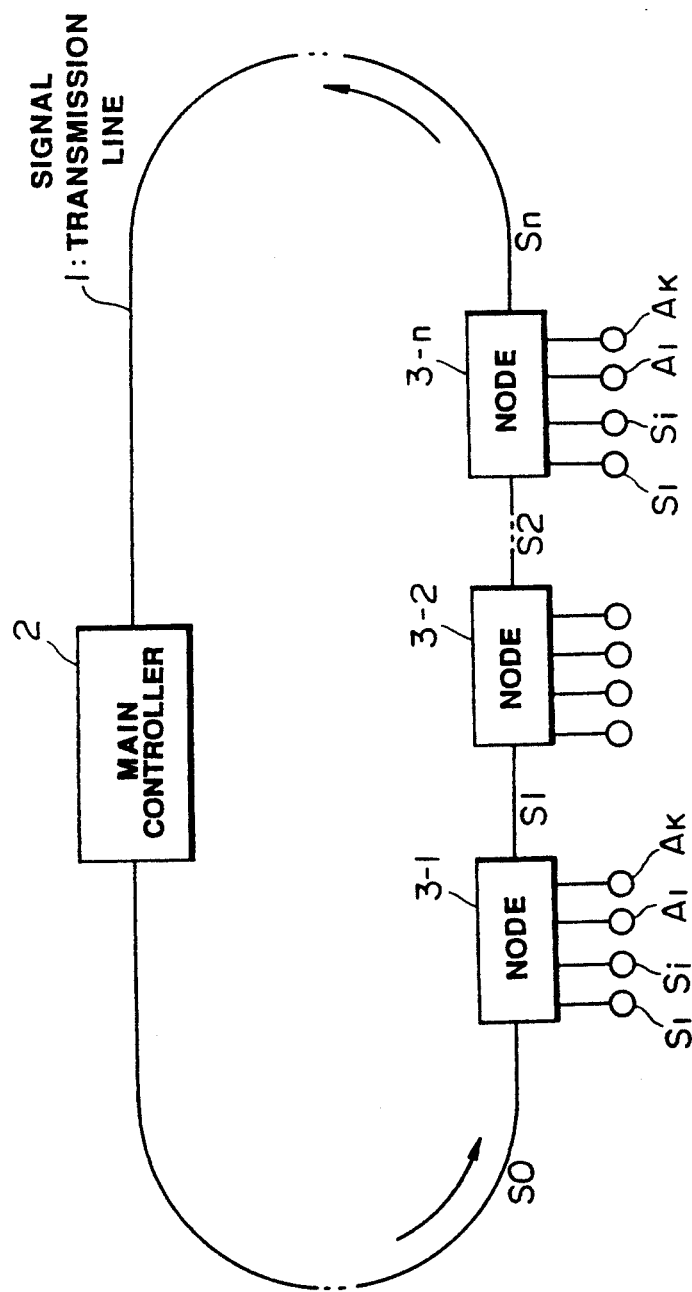
FIG. 1 is a block diagram which illustrates by way of example a structure of a serial control apparatus to which the present invention is applied.

FIG. 3 is a block diagram which schematically illustrates by way of example a concrete structure of each of nodes 3 - 1 to 3 - n each serving as an auxiliary controller for the serial control apparatus on the assumption that the serial control apparatus is typically constructed as schematically illustrated in FIG. 1. For the convenience of easy understanding of the present invention, it is assumed that all the node 3-1 to 3-n are used for controlling their corresponding acutators, and they are constructed in a common structure.

Referring to FIG. 3, each of the nodes 3-1 to 3-n includes an input circuit 301 into which a signal transmitted from a main controller 2 or a node at the preceding stage is inputted so as to allow the input signal to be demodulated as desired, a start code detecting circuit 302 in which the aforementioned "start code ST" indicative of the head end of a data row DATA is detected from the demodulated input signal with a predetermined logic structure, a stop code detecting circuit 303 in which the aforementioned "stop code SP" indicative of the tail end of the data row DATA is likewise detected from the demodulated input signal with another predetermined logic structure, an error check code inspecting circuit 304 in which presence or absence of an error that may occur between the preceding stage (preceding port) and the present stage (present port) is inspected based on the aforementioned "error check code ERC (to be generated and then outputted as an aforementioned code for retrieving presence or absence of an error via an error check code generating circuit 308 to be described later wherein the error check code generating circuit 308 is included in nodes peripheral to the node at the preceding stage)" derived from the demodulated input signal, an error code detecting circuit 305 for monitoring whether or not the aforementioned "error code ER (to be generated and added based on detection of an error occurrence via an error code adding circuit 309 to be described later wherein the error code adding circuit 309 is included in nodes peripheral to the node at the preceding state)" is added in order to inform an error occurrence to the demodulated input signal and then informing addition of the error code ER when it is found that the error code ER has been added, a data row length detecting circuit 306 in which a length of a data row extending between the "start code ST" and the "stop code SP" associated with the demodulated input signal is obtained in response to detection of the "start code ST" and the "stop code" so that presence or absence of an error occurrence is detected depending on the fact as to whether the obtained data row length is an adequate length or not, an OR circuit OR in which a logical sum comprising an error detecting output derived from the error check code detecting circuit 304, an error code detecting output derived from the error code detecting circuit 305 and a detecting output derived from the data row length inspecting circuit 306 in respect of an abnormality with the data row length is received, a data extracting circuit 307 in which control data for a plurality of corresponding actuators are extracted from the demodulated input signal (more exactly speaking, a data row included in the demodulated input signal), an error check code generating circuit 308 in which a new "error check code ERC" is generated in response to the demodulated input signal and from which the new "error check code ERC" is outputted, a switch circuit SW1 for controlling the demodulated input signal to be inputted into the error check code generating circuit 308 in an opened/closed (ON/OFF) state, an error code adding circuit 309 in which the aforementioned "error code" is generated and is added to the demodulated input signal as desired (by selecting a switch circuit SW2 to be described later), a switch circuit SW2 for selecting either one of the demodulated input signal, a signal (error check code ERC) to be generated and outputted from the error check code generating circuit 308 and a signal (error code ER) to be outputted from the error code adding circuit 309 as time elapses, an output circuit 310 in which a signal selectively outputted from the switch circuit SW2 is modulated as desired and from which the modulated signal is transmitted to a node at the subsequent stage or a main controller, a data latching circuit 311 in which the control data extracted from the data extracting circuit 307 are latched on closure (ON) of the switch circuit SW2, first to fourth latching circuits 312 to 315 in which the control data latched in the data latching circuit 311 are successively shifted on closure (ON) of the switch circuits SW1 to SW2 and they are then latched, a driver 316 in which a driving signal for driving a corresponding actuator is generated based on the data which have been latched in the fourth latching circuit 315 that is a latch circuit at the final stage among an array of latching circuits and from which the generated driving signal is outputted, an inner controller 317 for centrally controlling opening/closing (ON/OFF) or a manner of shifting each of a plurality of switch circuit SW1, SW2, SW3, SWL1, SWL2 and SWL3 in response to a detecting output from the start code detecting circuit 302 and the stop code detecting circuit 303, a logical sum output from the OR circuit OR and a signal representative of completion of outputting from the error check code generating circuit 308 and the error code adding circuit 309 in respect of the "error check code ERC" and the "error code ER", and a comparing circuit 318 in which the contents of latching operations performed by the first to third latch circuits 312 to 314 constituting an array of latching circuits is simultaneously compared with each other and the switch circuit SWL4 is opened (turned on) under a condition that all contents of latching operations are identical to each other.

In detail, in a case where receiving/transferring of a signal between adjacent nodes are effected via a cable made of metallic material (twits pair cable, coaxial cable or the like cable), the input circuit 301 is constructed such that it includes an impedance matching circuit, an input amplifier, a demodulating circuit and others. Alternatively, in a case where receiving/transferring of a signal therebetween is effected via an optical fiber, the input circuit 301 may be constructed such that it includes an optical/electrical converter, a demodulating circuit (Manchester demodulating circuit, CMI demodulating circuit or the like circuit).

Next, in a case where receiving/transferring of a signal between the respective nodes is serially effected, the output circuit 310 is likewise constructed such that it includes a demodulating circuit, a driver circuit and others. Alternatively, in a case where signal receiving/transferring is optically effected, the output circuit 310 may be constructed such that it includes a demodulating circuit, an electrical/optical converter or the like circuit.

The error check code inspecting circuit 304 comprises a hitherto known circuit for carrying out error check in accordance with CRC checking system, a vertical/horizontal parity checking system or the like system.

According to the embodiment of the present invention, the inner controller 317 comprises a controller which is constructed with its own control logic previously incorporated therein such that the switch circuit SW1 is closed (turned on) in response to output representative of detection of the "start code ST", the switch circuit SW3 is closed (turned on) for a predetermined period of time which is related to extraction of control data and moreover it is operated so as to allow the switch circuit SW1 to be restored to an opened state (OFF state) in response to output derived from detection of the "stop code SP" when the latter is detected, and the switch circuit SW2 shifts the initial selected state of "0-1" to another selected state of "0-2", that when a signal representative of completion of outputting of the "error check code ERC" is outputted from the error check code generation circuit 308, the switch circuit SW2 which has assumed the selected state of "0-2" is restored to the selected state of "0-1" and moreover the switch circuit SW2 is successively closed (turned on) for a predetermined period of time in accordance with an order of the switch circuit SWL3→the switch circuit SWL2→the switch circuit SW1, that when a signal representative of completion of outputting of the "error check code ERC" is outputted from the error check code generating circuit 308, the switch circuits SWL1 to SWL3 are opened (turned off), when it is found that an output representative of a logical sum derived from the OR circuit OR is kept at a level of logic "1", and that merely the switch circuit SW2 which has assumed the selected state of "0-2" is once shifted to the selected state of "0-3" and thereafter it is restored to the selected state of "0-1" under a condition that a signal representative of completion of adding of the "error code ER" is outputted from the error code adding circuit 309. Here, a manner of controlling the respective switch circuits as mentioned above with the inner controller 317 is illustrated in Table 1.

TABLE 1

|  | detection of start code | detection of stop code (completion of inspection of data row length) | completion of transference of error check code | completion of adding of error code |  |
|---|---|---|---|---|---|
|  | ↓ | ↓ | ↓ | ↓ |  |
| SW1 | opened (OFF) | closed (ON) | opened (OFF) | opened (OFF) | closed (ON) |
| SW2 | 0-1 | 0-1 | 0-2 | (output from OR = "0") 0-1 | 0-1 |
|  |  |  |  | (output from OR = "1") 0-3 |  |
| SW3 | opened (OFF) | closed for predetermined period of time (ON) | opened (OFF) | opened (OFF) | opened (OFF) |
| SWL1 | opened (OFF) | opened (OFF) | opened (OFF) | (output from OR = "0") OFF |ON| opened (output from | opened (OFF) |

TABLE 1-continued

|  |  |  |  | = "1") opened (OFF) |  |
|---|---|---|---|---|---|
|  |  |  |  | (output from OR = "0") OFF |ON| OFF |  |
| SWL2 | opened (OFF) | opened (OFF) | opened (OFF) | (output from OR = "1") opened (OFF) | opened (OFF) |
|  |  |  |  | (output from OR = "0") |ON| OFF |  |
| SWL3 | opened (OFF) | opened (OFF) | opened (OFF) | (output from OR = "1") opened (OFF) | opened (OFF) |

It should be noted that the main controller 2 for the serial control apparatus repeatedly transfers as a data row DATA a plurality of control data each having a same content to the node 3-1 at the first stage until there arises a necessity for updating the content of control to be carried out for each actuator.

FIG. 4 and FIG. 5 are a plurality of time charts each of which illustrates by way of example operations to be performed by the node 3-2 among the nodes 3-1 to 3-n, respectively. Signal processing operations and data extracting operations to be executed by the node 3-2 will be described in more detail below with reference to FIG. 4 and FIG. 5. As will be apparent from FIG. 4 and FIG. 5, according to the embodiment of the present invention, a method of transferring signals between adjacent nodes without time delay is employed for the data extracting circuit employable for the serial control apparatus.

Now, it is assumed that a signal is transmitted from the node at the preceding stage (node 3-1) to the node at the subsequent stage (node 3-2) in such a manner as shown in FIG. 4(a) in response to an occurrence of error during data transmission between the main controller 2 and the node 3-1. The inner controller 317 controls a shifting operation to be performed toward the ON side for the switch circuit SW1 which has been initially shifted to the OFF side, when the the "start code ST" is detected by the start code detecting circuit 302. Then, the error check code generating circuit 308 starts an operation for generating an error check code ERC to be transferred to the node at the subsequent stage (node 3-3) in response to the signal which has been inputted in that way. At this time, the switch circuit SW2 is held at the initial state as shown in FIG. 4(c) (selected state of "0-1") wherein the signal is selectively inputted into a terminal 1. The start code ST and the data row DATA are added to the output circuit 310 via the switch circuit SW2 as they are, and thereafter they are outputted to the node at the subsequent stage (node 3-3) as a signal S2 via the output circuit 310 (see FIG.

4(i)). In the meantime, the data extracting circuit 307 executes extraction of control data for controlling a corresponding actuator. The thus extracted control data are latched in the data latching circuit 311 as the switch circuit SW3 performs an ON operation in such a manner as shown in FIG. 4(d).

In response to the signal which has been transferred as shown in FIG. 4(a), the stop code detecting circuit 303 detects the "stop code SP" which is associated with the foregoing signal.

When the stop code detecting circuit 303 detects the "stop code" in that way, the inner controller 317 controls a shifting operation for shifting the switch circuit SW1 to the initial OFF state of the switch circuit SW1 and moreover shifting the switch circuit SW2 to the selected state wherein the signal is selectively inputted into its terminal 2 (selected state of "0-2" (see FIGS. 4(b) and (c)).

On completion of the changing operation in the switch circuit SW2, the "error check code ERC2" which has been newly generated in the error check code generating circuit 308 subsequent to the detected stop code SP is selectively outputted from the switch circuit SW and then transferred further via the output circuit 310 (see FIG. 4(i)).

In the meantime, in response to the signal which has been transferred from the node at the preceding stage (node 3-1), the error check code inspecting circuit 304, the error code detecting circuit 305 and the data row length inspecting circuit 306 execute an inspecting operation in such a manner as mentioned above. As a result, the error code detecting circuit 305 detects at least based on its detection of the "error code ER" that some data error has previously occurred. A result derived from the foregoing detection is transmitted to the inner controller 317 via the OR circuit OR.

Therefore, in this case, at the same time when a signal representative of completion of outputting from the error check code generating circuit 308 is issued therefrom, the switch circuit SW2 is shifted to the selected state wherein the signal is selectively inputted into its terminal 3 (selected state of "0-3"), and a signal to be outputted to the output circuit 310 is added with an "error code ER" to be outputted from the error code adding circuit 309 subsequent to the "error check code ERC2" which has been generated in and outputted from the error check code generating circuit 308 (see FIGS. 4 (c) and (i)). In this case, since the inner controller 317 does not control any closing operation for the switch circuits SWL 1 to SWL 3, the data which have been latched in the data latching circuit 311 are not received in the first latching circuit 312 and other subsequent circuits (see FIGS. 4(e) to (g)).

Thereafter, on completion of the adding operation in the error code adding circuit 309, a signal representative of completion of the error code adding operation is issued to the inner controller 317. In response to this signal, the inner controller 317 operates to shift the switch circuit SW2 to the initial selected state wherein the signal is selectively inputted into its terminal 1 (see FIG. 4(c)).

As the node 3-2 operates in the above-described manner, the signal S2 to be transferred from the node 3-2 to the node 3-3 at the subsequent stage is properly added with an "error code ER" for informing that the node 3-2 is held in the state wherein an error has occurred. At this time, there is no possibility that control date associated with the foregoing error are added to the corresponding actuator.

As exemplified in FIG. 5, in a case where no data abnormality is detected in each error check code inspecting circuit 304, the error code detecting circuit 305 and the data row length inspecting circuit 306, i.e., in a case where an output representative of a logical sum derived from the OR circuit OR is held at a level of "0", the inner controller 317 not only in the node at the preceding stage (node 3-1) but also in the node at the present stage (node 302) operates such that the switch circuit SW2 is shifted to the initial state of "0-1" as shown in FIG. 5(c), when a signal representative of completion of outputting of the "error check code ERC2" which has been generated in the error check code generating circuit 308 is added to the inner controller 317, as shown in Table 1. In addition, the inner controller 317 operates such that the switches SWL1 to SWL 3 are successively stepwise turned on for a predetermined period of time in an inverse order from the switch circuit SWL3 to the switch circuit SWL1, as shown in FIGS. 5(e) to (g).

Here, if a certain node (i.e., node 3-2) is particularly taken into account, latched data are successively shifted from the latching circuits at the preceding state (inclusive of the data latching circuit 311) to the latching circuit at the subsequent stage in the first to third latching circuits 312 to 314 at every time when a frame signal (signal S1) as shown in FIG. 5(a) is inputted into the foregoing node.

The comparing circuit 318 comprises a circuit in which contents of latching operations performed in the first to third latching circuits 312 to 314 are simultaneously compared with each other and if it is found that all the contents are identical to each other, the switch circuit SWL4 is turned on in such a manner as represented by a dotted line in FIG. 5(h) so that the data latched in the third latching circuit 314 are transferred to the fourth latching circuit 315, as mentioned above. In detail, the comparing circuit 318 is operated such that contents of data to be transferred to a plurality of corresponding actuators are received by the driver 316 via the fourth latching circuit 315 so as to allow the corresponding actuator to be practically driven via the driver 316 under a condition that the switch circuit SWL4 is turned on at the present node (node 3-2), i.e., under a condition that contents of all the control data latched in the respective first to third latching circuits 312 to 314 by a quantity equal to three times (i.e., by a quantity equal to three frames) to be transferred to the corresponding actuator are identical to each other.

Since each node operates in the above-described manner, even when there arises a data abnormality which can not be detected by error checking means such as the error check code inspecting circuit 304, the error code detecting circuit 305 and the data row length inspecting circuit 306 in the following typical cases, there is a substantial reduction in the danger that the corresponding actuator is incorrectly controlled based on abnormal data:

(a) a case where the main controller delivers as its control data the data which have been originally erroneous, and (b) a case where one datum among an inputted data row is outputted in an inverse state due to incorrect operations performed in each node.

Next, for the convenience of reference, a transition of latching operations performed in the first to fourth latching circuits 312 to 315 in a certain node inclusive of a comparing operation to be performed by the comparing circuit 318 (ON/OFF operations to be performed by the switch circuit SWL4) is listed in Table 2 with respect to a case where ten signals corresponding to a frame 1 to frame 10 are inputted into the node wherein desired control data each having a control content corresponding to a logic level of "1" are included in the frames 1 to 10 for first to third signals and desired control data each having a control content corresponding to a logical level of "0" are includes for a fourth signal and subsequent signals.

TABLE 2

| frame (signal) | first latching circuit | second latching circuit | third latching circuit | switch circuit SWL4 | fourth latching circuit | remarks |
|---|---|---|---|---|---|---|
| frame 1 | "1" | — | — | OFF | — | "1" data arrived |
| frame 2 | "1" | "1" | — | OFF | — | three times. |
| frame 3 | "1" | "1" | "1" | ON | "1" | "1" data outputted at three times (actuator driven) |
| frame 4 | "0" | "1" | "1" | OFF | "1" | "0" data arrived |
| frame 5 | "0" | "0" | "1" | OFF | "1" | three times. |
| frame 6 | "0" | "0" | "0" | ON | "0" | "0" data outputted at three times (actuator driven) |
| frame 7 | "1" | "0" | "0" | OFF | "0" | incorrect data "1" |
| frame 8 | "0" | "1" | "0" | OFF | "0" | arrived. this |
| frame 9 | "0" | "0" | "1" | OFF | "0" | incorrect data "1" |
| frame 10 | "0" | "0" | "0" | ON | "0" | not outputted (not latched in latched in fourth latching circuit). |

It should be noted that in the above table a mark "-" represents that the node is held at the initial state when an electric power source is turned on and either one of a mark "1" and a mark "0" represents that a safety value is preset for the node. In a case where the shown embodiment of the present invention is applied to the node, the state represented by the mark "0" is preset for the node. Alternatively, a circuit condition may be set such that the comparing circuit 318 is activated only when signals corresponding to three frames are inputted into the node at the initial time.

As will be apparent from the above description, according to the embodiment of the present invention, when any error occurs with data to be transferred from the main controller 2 to the respective nodes 3-1 to 3-n and vice versa, each node can detect an occurrence of the error so as to allow incorrect controlling of an actuator due to the data associated with the error to be prevented reliably. In addition, the node can reliably prevent incorrect controlling of the actuator due to erroneous data even in a case where a data error occurs with the erroneous data which can not be detected by usual error checking means.

In the aforementioned embodiment, description has been made as to a case where the number of latching circuits of which latching operation is compared in the comparing circuit in respect of its content is set to 3 as represented by the first to third latching circuits 312 to 314. However, the number of latching circuits may be determined arbitrarily. When the node is put in practical use, an adequate numeral is selectively determined within the range wherein requirements for reliability on a controlling operation and a speed of the controlling operation (response speed) are fully satisfied.

In addition, in the aforementioned embodiment, in a case where contents of latching operations performed in the respective latching circuits are identical to each other, data latched in the latching circuit at the final stage (third latching circuit 314) are extracted from the node as effective control data for the corresponding actuator. However, data to be extracted may basically be extracted from any latching circuit, provided that the data to be extracted are data which are latched in a latching circuit of which latching operation is compared in respect of its content.

Additionally, in the aforementioned embodiment (particularly, as illustrated in Table 2), it is supposed that data constituting the data row DATA representative of a signal (frame signal) to be transferred between the respective nodes for controlling each actuator comprise one bit. However, such data structure as mentioned above may be determined arbitrarily. The embodiment of the present invention may equally be applied to control data comprising plural bits.

Further, in the aforementioned embodiment, as shown in FIG. 1, it is assumed that the serial control apparatus is constructed such that the main controller and the respective nodes are serially connected in a loop-shaped configuration. Alternatively, the embodiment of the present invention may equally be applied to the serial control apparatus wherein the respective nodes are serially connected to the main controller in a row-shaped configuration (daisy chain-shaped configuration).

Figure 2:
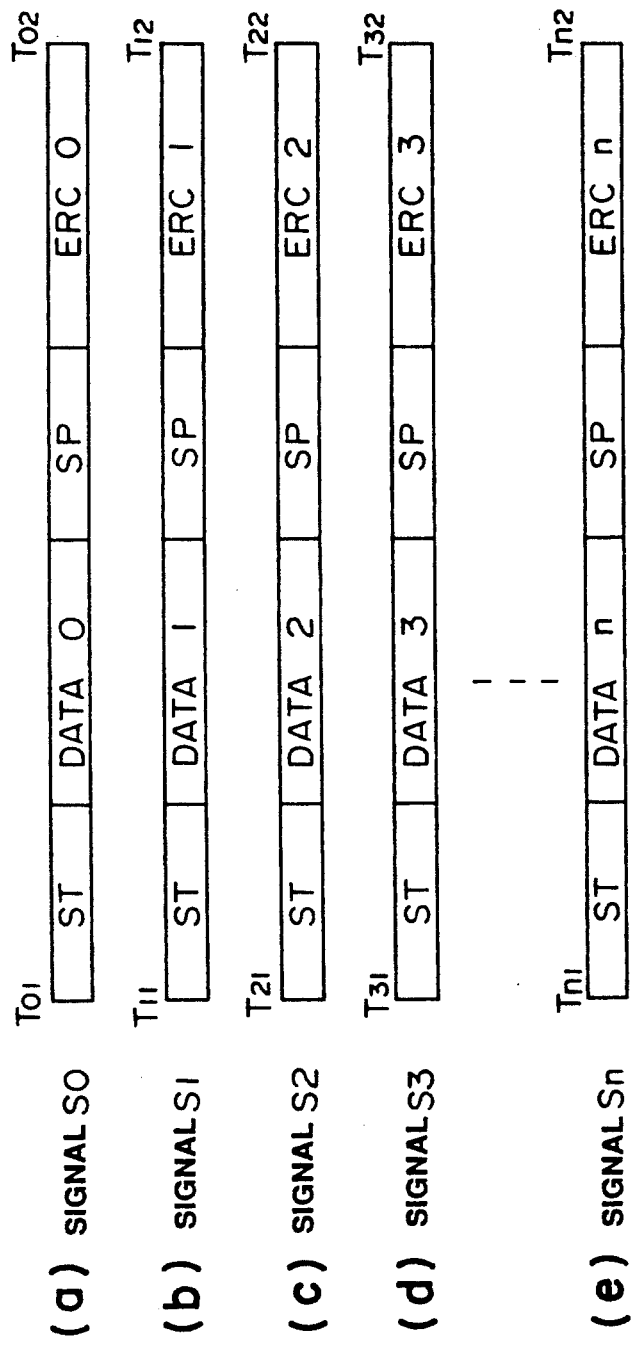
FIG. 2 shows a plurality of time charts each of which illustrates by way of example a pattern representative of a signal frame employable for the serial control apparatus.

A frame pattern representative of signals as shown in FIG. 4, FIG. 5 and FIG. 2 and a protocol for receiving and transmitting signals should not be limited to those shown in these drawings. Any other pattern of frame structure and protocol may be employed, provided that it is proven that extraction of control data is accomplished reliably. After all, according to the present invention, all the nodes serially connected to each other via the main controller in a loop-shaped configuration or serially connected to the main controller in a row-shaped configuration (daisy chain-shaped configuration) include at least means for properly extracting control data in response to a signal, a plurality of latching means for latching the control data extracted each time the signal having the control data included therein is inputted into the relevant node, while successively shifting the latched control data, comparing means for simultaneously comparing contents of the control data latched by the latching means with each other to output a predetermined coincidence signal when it is found that all the compared contents are identical to each other, and means for separately extracting contents of the data latched by the latching means as effective control data for actuating a plurality of corresponding actuators when the coincidence signal is outputted from the comparing means, respectively. In a case where error latching means is added to each node, selection of the latching means may be made arbitrarily.

It should be noted that, with the serial control apparatus wherein a danger of causing data abnormality as mentioned above in the foregoing paragraphs (a) and (b) need not be taken into account, it suffices that two latching means, i.e, first and second latching means (referring to FIG. 3, a data latch 311 is considered as first latching means and a first latch 312 is considered as second latching means so that an output from the first latch 312 is directly added to the driver 316) are included in a signal passage by way of which data extracted at each node are fed to each driver for a plurality corresponding terminal units (actuators) and, in a case where an error or an error history is detected when the extracted data are to be transferred further, a data latching operation to be performed by the latching means disposed on the driver side (first latch 312) is inhibited so as not to allow erroneous data or uncertain data to be fed to the driver.

Figure 6:
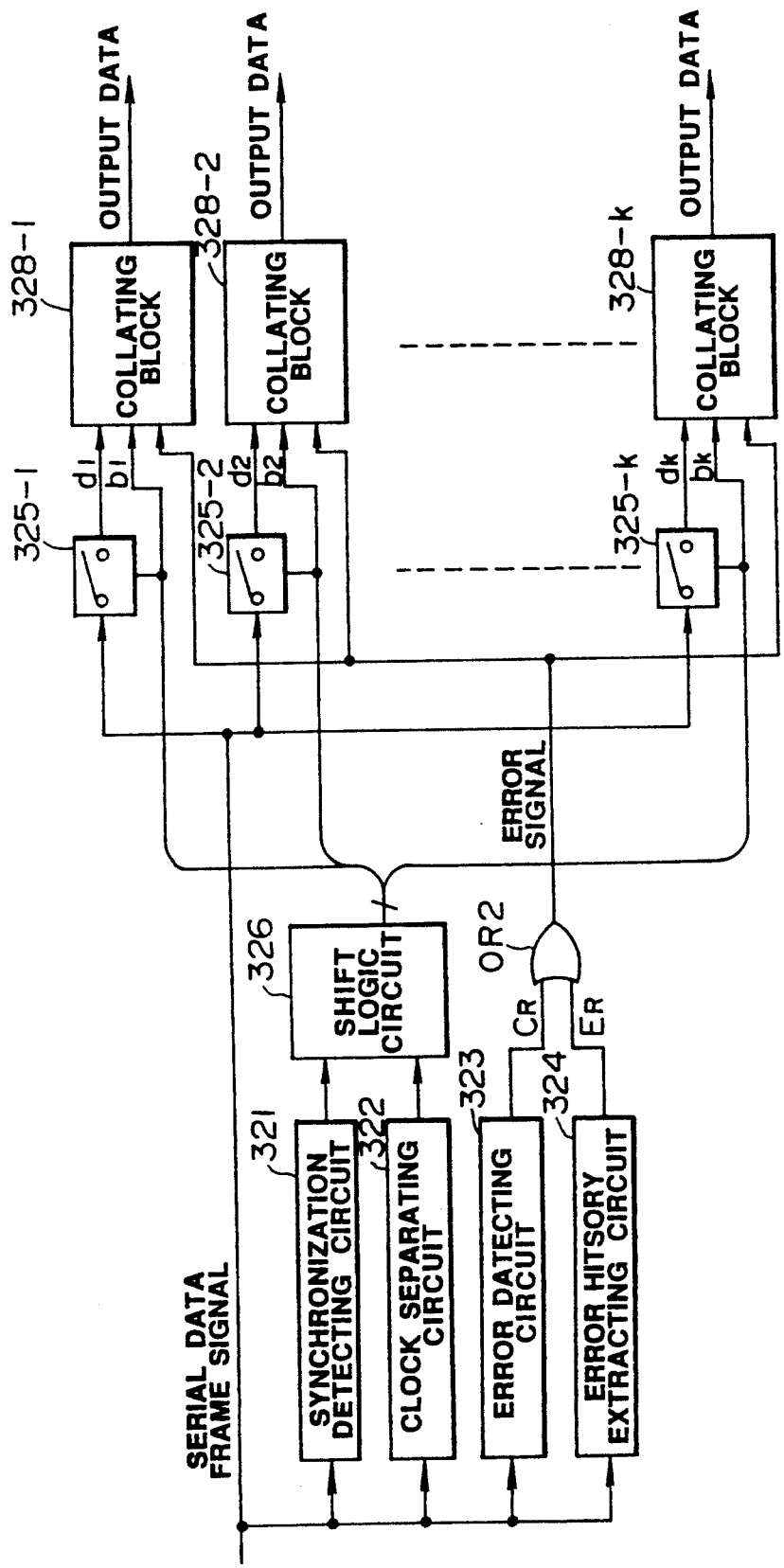
FIG. 6 is a block diagram which schematically illustrates a data extracting circuit in accordance with another embodiment of the present invention.
Figure 7:
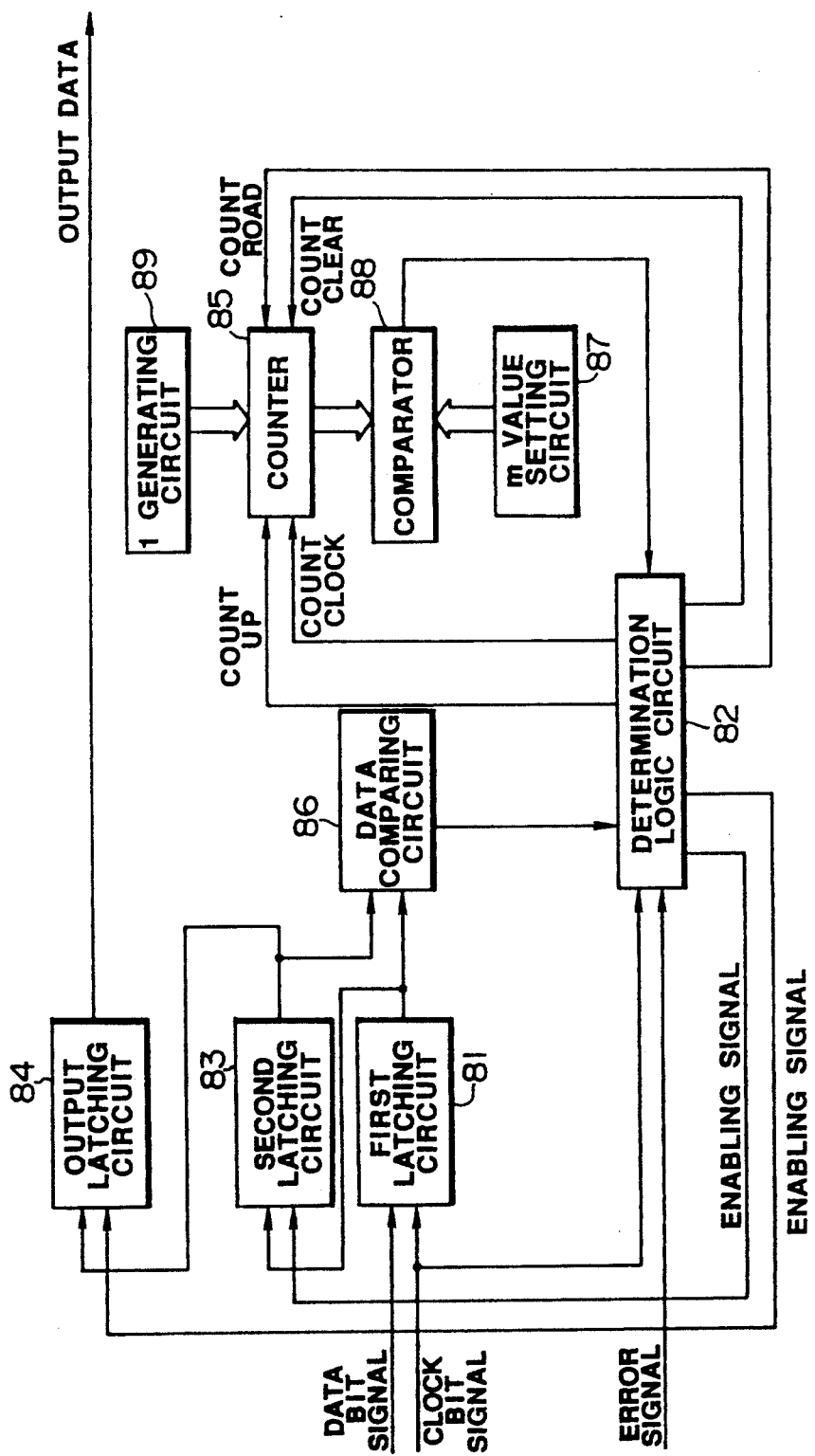
FIG. 7 is a block diagram which schematically illustrates by way of example a concrete structure of a collating block shown in FIG. 6.

FIG. 6 to FIG. 8 illustrate a data extracting circuit in accordance with other embodiment of the present invention. In this embodiment, a counter circuit is substituted for an array of latching circuits as mentioned above. In a case where the serial control apparatus to which this embodiment is applied is constructed as illustrated in FIG. 1, the counter circuit is arranged in the same manner as in the embodiment shown in FIG. 3 to FIG. 5.

FIG. 6 is a circuit diagram which illustrates an input section into which data frame signals are inputted at the nodes (3-1 to 3-n) each including actuators of which number is represented by k. Also in this section, a plurality of data frame signals each having a same data content are repeatedly received by N times.

Referring to FIG. 6, serial data frame signals sent from the main controller 2 or the node at the preceding stage (see FIG. 2) are added to a synchronization detecting circuit 321, a clock separating circuit 322, an error detecting circuit 323, an error history extracting circuit 324 and a plurality of switch circuits 325-1 to 325-k corresponding to each of the k actuators, respectively.

The synchronization detecting circuit 321 serves to detect a time slot associated with data bit signals dl to dk distributed to the k actuators corresponding to the present node from the data row DATA included in the frame signal (which is considered to be, e.g., a CMI coded frame signal). A signal representative of the time slot associated with the detected data bit signals is added to a shift logic circuit 326.

The clock separating circuit 322 serves to reproduce a clock signal from the foregoing frame signal, and the reproduced clock signal is added to the shift logic circuit 326.

The error checking circuit 323 is adapted to perform, e.g., a CRC checking operation based on the error check code ERC included in the frame signal. When it detects a data error, it raises a detection output CR up to a logical high level.

The error history extracting circuit 324 serves to read a history of the error detected in the node at the preceding stage based on the error code R included in the frame signal. When it is found that an error is present, the error history extracting circuit 324 raises a detection output ER up to a logical high level.

The detection output CR derived from the error detecting circuit 323 and the detection output ER derived from the error history extracting circuit 324 are added as error signals to each of k collating blocks 328-1 to 328-k via an OR circuit OR.

When a signal representative of a time slot associated with the respective data bit signals d1 to dk detected in the synchronization detecting circuit 321 as well as a clock signal separated in a clock separating circuit 322 are inputted into the shift logic circuit 326, clock bit signals b1 to bk are successively delivered to the respective switch circuits 325-1 to 325-k and the respective collating blocks 328-1 to 328-k in synchronization with the clock signal per each time slot associated with the respective data bit signal d1 to dk.

When a data bit signal d1 in the form of a frame signal is inputted into the switch circuit 325-1, a clock bit signal b1 is inputted into the switch circuit 325-1 which in turn is closed in response to the clock bit signal b1, whereby the data bit signal d1 is delivered to the collating block 328-1. Subsequently, when data bit signals d2 to dk each in the form of a frame signal are inputted into other switch circuits 325-2 to 325-k in the same manner as mentioned above, clock bit signals b2 to bk are inputted into the switch circuits 325-2 to 325-k which in turn are closed in response to the clock bit signals b2 to bk, whereby the respective data bit signals d2 to dk are delivered to other collating blocks j28-2 to 328-k.

Therefore, the respective data bit signals d1 to dk and the respective clock bit signals b1 to bk are distributed and added to the respective collating blocks 328-1 to 328-k. Delivery of signals to the collating blocks 328-1 to 328-k is carried out at every time when a data frame signal is transmitted to the data extracting circuit.

Thus, when a data frame signal having a same data content is repeatedly transmitted to the data extracting circuit by N times, same N data bit signals d1 to DN as shown in FIG. 8 are successively added to, e.g., the collating block 328-1 and thereby N clock bit signals b1 are likewise added to the collating block 328-1. When an error or an error history is detected from the relevant frame signal, an error signal having a logical high level is added to the collating block 328-1.

The collating blocks 328-1 to 328-k are constructed as illustrated in FIG. 7, respectively. Here, description will be typically made on an operation to be performed by the collating block 328-1.

The respective data bit signals d1-1 to d1 - dN shown in FIG. 8 are successively added to a first latching circuit 81 at every time when a data frame signal is transmitted to the data extracting circuit. This causes the clock bit signal b1 to be successively added to the first latching circuit 81 and a determination logic circuit 82. The error signal is raised up to a logical high level when an error or an error history is detected, as mentioned above. Then, the error signal is added to the determination logic circuit 82.

The determination logic circuit 82 serves to deliver an enabling signal to a second latching circuit 83 and an output latching circuit 84. In addition, the determination logic circuit 82 serves to deliver a counter clock signal, a count-up signal, a count-load signal and a count-clear signal to a counter 85 in synchronization with the clock bit signal b1.

Now, it is assumed that the count clear signal is added to the counter 85 from the determination logic circuit 82, e.g., at a time point T shown in FIG. 8. This causes the count value derived from the counter 85 to be cleared (initialized), resulting in the count value being reduced to a level of zero.

Thereafter, the first clock bit signal b1 is inputted into the first latching circuit 81 in the form of an enabling signal so that the first data bit signal d1 - 1 is latched in synchronization with the first clock bit signal b1. At this time, if an error or an error history is not detected with respect to the frame signal including the first bit signal d1 - 1, the error signal is held at a logical low level.

After the count-clear signal is delivered to the counter 85 from the determination logic circuit 85 in the above-described manner, the first clock bit signal b1 is inputted into the determination logic circuit 82. If it is found immediately after inputting of the first clock bit signal b1 in that way that the error signal is held at a logic low level, the count-load signal is added to the counter 85.

When the count-load signal is inputted into the counter 85, a "1" generating circuit 89 is loaded with a value "1" as a count value which indicates a count vale "1".

Next, the determination logic circuit 82 adds an enable signal to the second latching circuit 83.

When the enabling signal is inputted into the second latching circuit 83, the first data bit signal d1 - 1 transmitted from the first latching circuit 81 is latched in the second latching circuit 83. Thus, at this time, the first data bit signal has been latched in the both first and second latching circuits 81 and 83.

Next, the second data bit signal d1 - 2 is latched in the first latching circuit 81. At this time, the determination logic circuit 82 stops to deliver an enabling signal to the second latching circuit 83, whereby the first data bit signal d1 - 1 is kept latched in the second latching circuit 83.

A data comparing circuit 86 compares the first data bit signal d1 - 1 in the second latching circuit 83 with the second data bit signal d1 - 2 in the second data bit signal d1 - 2. If it is found that the both data bit signals coincide with each other, a signal representative of an occurrence of the coincidence is added to the determination logic circuit 82.

When the foregoing both data bit signals are inputted into the determination logic circuit 82, the determination logic circuit 82 adds a count-up signal to a counter 85. Then, when the count-up signal is inputted into the counter 85, the counter 85 advances the count value which has assumed "1" up to this time by a value of "1" to reach a count value of "2".

Similarly, the preceding data bit signal in the first latching circuit 81 and the preceding data bit signal in the second latching circuit 83 are compared with each other at every time when third and subsequent data bit signals, i.e., data bit signals d1-3 to d1-N are latched in the first latching circuit 81. When it is found that the foregoing data bit signals coincide with each other, the counter 85 advances the count value by a value of "1".

Therefore, in a case where the third and subsequent data bit signals, i.e., the data bit signals d1-2 to d1-N coincide with the preceding data bit signal by m times (where m is equal to or smaller than N), the counter 85 assumes a count value represented by a value m. Here, it should be added that the count value m is preset in a value setting circuit 87.

A comparator 88 compares the count value derived from the counter 85 with the value m derived from the m value setting circuit 87. When it is found that the count value coincides with the value m, i.e., the count value reaches the value m, the comparator 88 adds a signal indicative of an occurrence of the coincidence to the determination logic circuit 82.

When the foregoing signal is inputted into the determination logic circuit 82, the determination logic circuit 82 adds an enabling signal to an output latching circuit 84 and moreover adds a count-clear signal to the counter 85.

When the foregoing enabling signal is inputted into the output latching circuit 84, the output latching circuit 84 latches in the second latching circuit 83 the data bit signal which has been latched at that time so that the data bit signal is outputted from the output latching circuit 84 as output data. In addition, when the count-clear signal is inputted into the counter 85, the counter 85 clears the count value which in turn is reduced to a level of zero.

Specifically, when it is found that a (m−1) number of data bit signals among the second and subsequent data bit signals, i.e, the data bit signals d1-2 to d1-N coincide with the preceding data bit signal, respectively, it is considered that the data bit signals d1 which have been repeatedly transmitted by times are a correct signal, respectively, whereby the data bit signal which has been latched in the second latching circuit 83 at that time is outputted therefrom as output data via the output latching circuit 84. The output data are added to one actuator A1 in the present node so as to allow the actuator A1 to be actuated.

Next described is a case where either one of an error and an error history is detected by the error detecting circuit 323 and the error history extracting circuit 324 with the error signal during an operation for receiving the frame signal in the error detecting circuit 323 and the error history extracting circuit 324 shown in FIG. 6. In this case, it is assumed that the error signal is raised up to a logic high level.

In this case, the data bit signal d1−(i−1) included in the preceding frame signal is latched in the second latching circuit 83, while the data bit signal d1−i included in the frame signal is latched in the first latching circuit 81 of the collating block 328-1. Then, the data bit signals in the first latching circuit 81 and the second latching circuit 83 are compared with each other in the data comparing circuit 86. Since the error signal is held at the logic high level at this time, the determination logic circuit 82 does not add any count-up signal to the counter 85 irrespective of results derived from the comparison in the data comparing circuit 86. For the reason, the counter 85 does not count up the count value. In this case, the determination logic current 82 does not add any enabling signal to the second latching circuit 83.

Specifically, in a case where either one of an error and an error history is not detected with one of the frame signals generated within m times while the frame signals each having a same data content are repeatedly received by N times, the counter 85 does not update the count value without any comparative collation with respect to the data bit signal included in each frame signal. Consequently, even though repeated receipt of the data frame signals each having a same data content by m times is completed, the count value derived from the counter 85 does not reach a value m. For the reason, a signal indicating that the count value reaches the value m is not outputted to the determination logic circuit 82. Therefore, any enabling signal is not outputted from the determination logic circuit 82 to the output latching circuit 84, and the data bit signal latched in the second latching circuit 84 is not outputted as output data via the output latching circuit 84. Thus, if either one of an error and an error history is detected with the frame signal, the data bit signal included in the frame signal is considered as an erroneous signal without any processing to be performed for the data bit signal.

In a case where the data bit signal d1−i is considered as an erroneous signal, an error code ER indicative of an error is generated in the relevant node so that a frame signal inclusive of the error code ER is delivered to the node at the subsequent stage or the main controller 2.

Next, description will be made below as to a case where while the count value derived from the counter 85 does not reach the value m, the data bit signal latched in the first latching circuit 81 is different, from the data bit signal latched in the second latching circuit 83 and moreover an error or an error history is not detected from the frame signal including a data bit signal latched in the first latching circuit 81.

In this case, a signal indicating that the data bit signal latched in the first latching circuit 81 is different from the data bit signal latched in the second latching circuit 83 is inputted into the determination logic circuit 82 and moreover a signal indicating that the error signal held at the logical low level (indicating that no error occurs) is inputted into the determination logic circuit 82. In response to these signals, the determination logic circuit 82 delivers an enabling signal to the second latching circuit 83 and forcibly delivers a count load signal to the counter 85 so as to allow the count value to assume a value of "1".

When the enabling signal is inputted into the second latching circuit 83, the second latching circuit 83 latches the data bit signal d1−i latched in the first latching circuit 81. When the count-load signal is inputted into the counter 85, the counter 85 is loaded with a value "1" derived from the "1" value generating circuit 89 and indicates this value "1" as a count value.

Thereafter, a subsequent data bit signal is latched in the first latching circuit 81 every time the data bit signal is transmitted from the first latching circuit 81, and when the data bit signal latched in the first latching circuit 81 is coincident to the data bit signal latched in the second latching circuit 83, the counter 85 counts up the count value by a value of "1". When the count value derived from the counter 85 reaches the value m, the data bit signal latched in the second latching circuit 83 is outputted as output data via the output latching circuit 84.

Specifically, in a case where the count value derived from the counter 85 does not reach the value m, the data bit signal latched in the first latching circuit 81 is different from the data bit signal latched in the second latching circuit 83 and moreover an error or an error history is not detected with the frame signal including the data bit signal latched in the first latching circuit 81, this represents that communication with the frame signal having the same data content as that of those available up to this time is shifted to communication with the frame signal having other data content rather than the foregoing one. To this end, the data bit signal latched in the first latching circuit 81 is then latched in the second latching circuit 83 and the counter 85 sets the count value to a value "1", whereby the counter 85 is ready to receive a signal subsequent to the frame signal having the other data content which has been shifted in that way.

While the collating block 328 - 1 has been typically described above, other collating blocks 328 - 2 to 328 - k of course operate in the same manner as the collating block 328 - 1. In detail, the other collating blocks 328 - 2 to 328 - k operate such that the data bit signals d2 to dk and the clock bit signals b2 to bk are repeatedly inputted thereinto to carry out collation with the data bit signals, respectively. When the count value reaches the value m, the data bit signals d2 to dk are outputted to a corresponding actuator as output data, respectively.

In this manner, according to this embodiment of the present invention, the data bit signals which have been successively inputted in the data extracting circuit can comparatively be collated merely by arranging the first latching circuit and the second latching circuit. Therefore, even in a case where the number of data bit signals to be compared with each other (times of comparing operations) need to be increased, a scale of circuit arrangement may be reduced. In addition, it is possible to easily vary many items, such as times of comparing operations, i.e., reliability on controlling operations, response speed to controlling operation or the like item merely by properly varying the value m which has been set in the m value setting circuit. The more the number of comparing operations increases, the more the reliability on controlling operations increases. . Further, the smaller the number of comparing operations becomes, the more the responsiveness to controlling operation is increased. In practical use, times of comparing operations, i.e., the value m is adequately set within the range that the foregoing items are fully satisfied.

It should be noted that illustration of the start code detecting circuit, the stop code detecting circuit and others are eliminated from the drawing of FIG. 6 for the purpose of simplification.

Not only in the first embodiment bust also in the second embodiment as mentioned above, the present invention is equally applicable to control data included in frame signals for actuators as well as input data transferred from sensors, i.e., input data transferred from each node associated with the main controller 2. In this case, while data bit signals indicative of input data are repeatedly inputted from sensors (at each node) into the main controller 2, the first data bit signal is latched in the first latching circuit and subsequent data bit signals are latched in the second latching circuit. When the data bit signal latched in the first latch circuit coincides with the data bit signal latched in the second latching circuit signal by a single time or by plural times, these data bit signals are considered as true sensor data and they are then formally received in the main controller 2.

If a trouble of line disconnection takes place for some reason in a loop-shaped signal transmission line extending between the present node and other node in the serial control apparatus as shown in FIG. 1, signals transferred from nodes on the upstream side can not be received by the serial control apparatus for a period of time longer than a predetermined one, whereby actuators corresponding to the present node are brought in the operative state before the trouble of line disconnection takes place in that way. Since a signal transmission line extending to the main controller from nodes on the upstream side where the trouble of line disconnection takes place is held in a normal state, actuators corresponding to the nodes on the upstream side are continuously actuated in response to signals from the main controller. This means that the whole system holds in a mixed state the nodes which normally operate in response to signals from the main controller and the nodes of which operation is stopped in the operative state before the trouble of line disconnection takes place. Consequently, an operation to be realized in combination with operations to be performed in all the nodes undesirably becomes an erroneous operation. This leads to a possibility that a trouble in the form of damage or breakage takes place with the serial control apparatus itself or objects to be controlled.

Next, FIG. 9 to 17 illustrate a data extracting circuit in accordance with another embodiment of the present invention, wherein damage or breakage of the serial control apparatus or objects to be controlled can effectively be prevented even when a troublesome line disconnection takes place.

First, an outline of this embodiment will be described with reference to FIG. 9.

The main controller 2 shown in FIG. 1 delivers a frame signal to the signal transmission line 1 in the above-described manner, wherein the frame signal includes a start code ST at the head end, a control data row DATA for each node at the subsequent location, a stop code SP indicative of the end of the control data row at the subsequent location and an error check code ERC such as a parity check code, a CRC code or the like at the tail end, as shown in FIG. 9(a).

When troublesome line disconnection takes place for some reason between the present node and the signal transmission line 1, the respective nodes 3 - 1 to 3 - n inform the main controller 2 via nodes on the downstream side that the troublesome line disconnection has taken place.

For example, in a case where a troublesome line disconnection takes place at a position on the signal transmission line 1 between the node 3 - 2 and the node 3 - 1 shown in FIG. 1, the node 3 - 2 delivers an information on the line disconnection in the form of a frame signal comprising a line disconnection code BEK and a line disconnection position code NO. (0) to the main controller 2 via the nodes 3 - 3 to 3 - n on the downstream side, as shown in FIG. 9(b).

The information on the line disconnection is received by the nodes 3 - 3 to 3 - n on the downstream side. When the nodes 3 - 3 to 3 - n receive the information on the line disconnection, respectively, a plurality of actuators A1 to Ak associated with the present node are forcibly actuated toward the safe side and then the present node updates the line disconnection position code NO. (0) by a value of "1" so that the updated code is transmitted further to the nodes on the downstream side. Consequently, an information on the line disconnection with the line disconnection position code shifted to "NO. (n−2)" as shown in FIG. 9(c) is transmitted from the node 3 - n on the ultimate downstream side and then inputted in the main controller 2.

In view of the fact that the line disconnection code has been shifted to "NO. (n−2)", the main controller 2 recognizes that the line disconnection takes place at a position just before the node 3 - 2 at the second stage as viewed from the upstream side and then sends to the node 3 - 1 on the upstream side an information for actuating the actuators A1 to Ak toward the safe side, i.e., an information of DATA=0, as shown in FIG. 9(d). This causes a plurality of actuators A1 to Ak associated with the node 3 - 1 to be actuated toward the safe side in the same manner as in the nodes 3 - 3 to 3 - n. In addition, the node 3 - 2 that is a signal supply source for sending an information on the line disconnection operates such that a plurality of actuators A1 to Ak associated with the node 3 - 2 are actuated toward the safe side.

As a result, an operation of the system is interrupted while the system is held in the operative state wherein a number of actuators A1 to Ak associated with all the nodes are actuated toward the safe side.

Here, it should be noted that an occurrence of the line disconnection can easily be detected by the fact that no communication information is sent from nodes on the upstream side (main controller in a case of the node on the ultimate upstream side) for a period of time longer than a predetermined one. In a case where the trouble of line disconnection takes place at a position just before the node 3 - 2 as shown in FIG. 1, the main controller transitionally carries out detection on the assumption that a line disconnection takes place in the nodes 3 - 3 to 3 - n. However, finally, the main controller determines the node 3 - 2 as an information supply source for sending an information on the line disconnection. Therefore, other nodes 3 - 3 to 3 - n are released from the operative state wherein the line disconnection is reliably detected.

Figure 10:
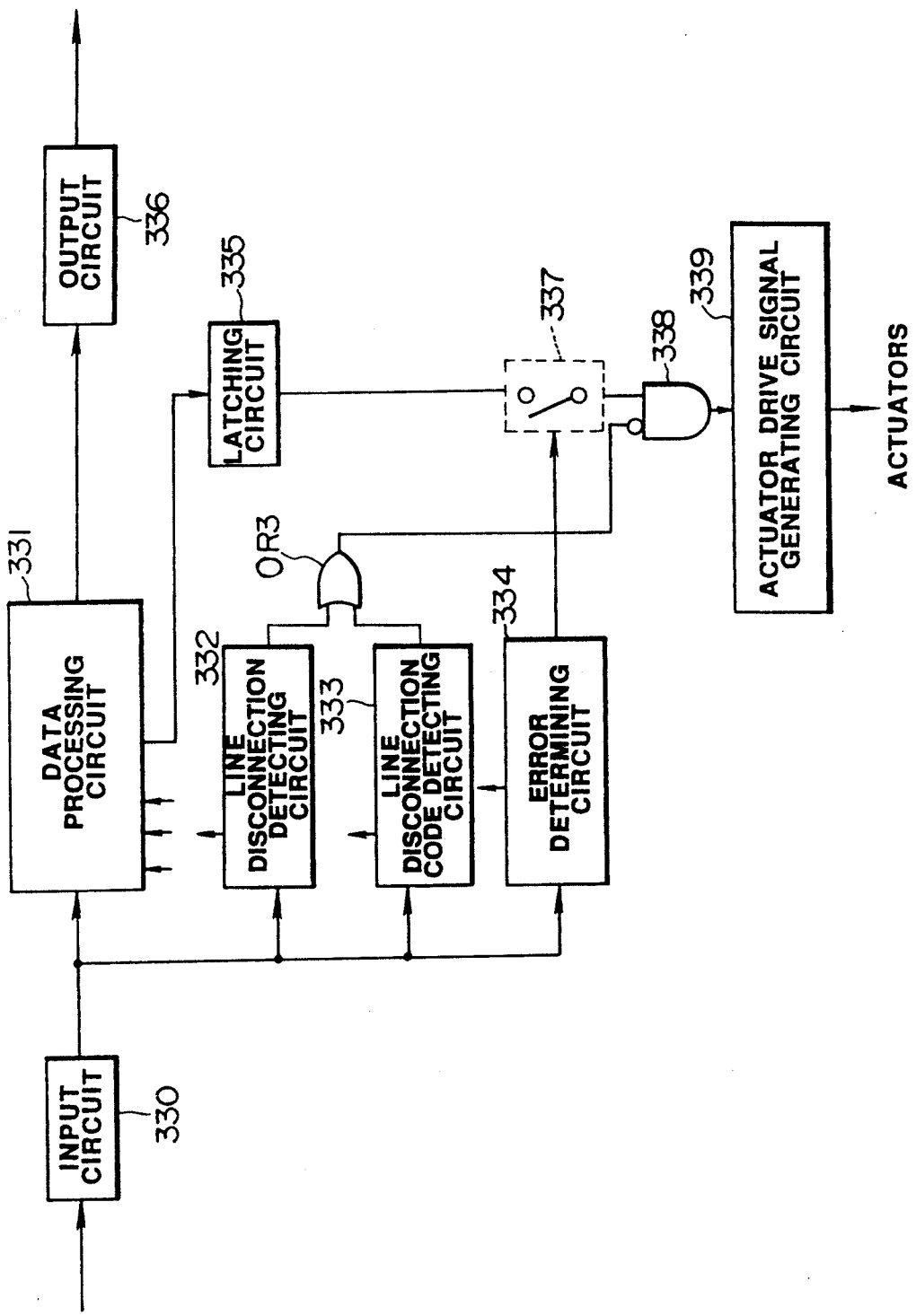
FIG. 10 is a block diagram which schematically illustrates a structure of the data frame circuit in accordance with the latter embodiment of the present invention.

FIG. 10 is a block diagram which illustrates by way of example the inner structure of each of the nodes 3 - 1 to 3 - n in an undesirable state wherein a line disconnection takes place. With the node structure as shown in the drawing, a frame signal sent from a certain node on the upstream side is received by an input circuit 330. In a case where the frame signal is modulated in the form of, e.g., a CMI code or the like code and then transmitted further, the input circuit 330 is constructed in a circuit structure such that the frame signal is demodulated in the form of a NRZ code. The demodulated signal is outputted to a data processing circuit 331 (inclusive of a data extracting circuit and others as shown in the aforementioned embodiment), a line disconnection detecting circuit 332, a line disconnection code detecting circuit 333 and an error determining circuit 334.

Basically, the data processing circuit 331 operates such that only data or a data row DATA for the present node are extracted from the data row DATA for all the node included in the demodulated frame signal, they are held in a latching circuit 335, thereafter, output signals from sensors S1 to Sn are inserted in a time slot associated with the present node and they are modulated in an output circuit 336 again so as to allow the demodulated output signals to be sent to nodes on the downstream side. The latching circuit 335 serves to deliver the thus held data or data row to an actuator driving signal generating circuit (driver) 339 via gates 337 and 338 so as to drive a plurality of actuators A1 to Ak.

On the other hand, the error determining circuit 334 serve to determine presence or absence of an error with the received data row DATA by using the error check code ERC. When the error determining circuit 334 finds presence of an error, it opens the gate 337 to inhibit data or a data row from being inputted into the actuator driving signal generating circuit 339 from the latching circuit 335.

In a case where the line disconnection detecting circuit 332 does not receive a frame signal from nodes on the upstream side for a period of time longer than a predetermined one which is set by a timer (not shown), the line disconnection detecting circuit 332 determines that the line disconnection takes place at a position upstream of the present node. Then, the data processing circuit 331 generates an information on the line disconnection in a frame structure as shown in FIG. 9(b) so that the information is sent to nodes on the downstream side via the output circuit 336. In addition, a signal indicative of detection of line disconnection is inputted into the line disconnection detecting circuit 332 as an inhibition input via an OR gate OR3. At this time, when it is found that a gate (AND gate) 338 is kept opened, the line disconnection detecting circuit 332 operates to close the AND gate 338, as is apparent from time charts shown in FIG. 11, whereby driving of the actuators A1 to Ak is interrupted. In other words, when the driving signal disappears, the actuators A1 to Ak are actuated toward the safe side until their actuation stops.

On the other hand, in a case where the line disconnection detecting circuit 332 receives an information on the trouble of line disconnection in a frame structure as shown in FIG. 9(b), the line disconnection detecting circuit 332 detects a line disconnection code BRK in the information on the trouble of line disconnection and recognizes that the trouble of line disconnection takes place at a position upstream of the present node so that a signal equivalent to the line disconnection detecting signal derived from the line disconnection detecting circuit 332 is inputted into the OR gate OR3 to stop driving of the actuators A1 to Ak.

Figure 12:
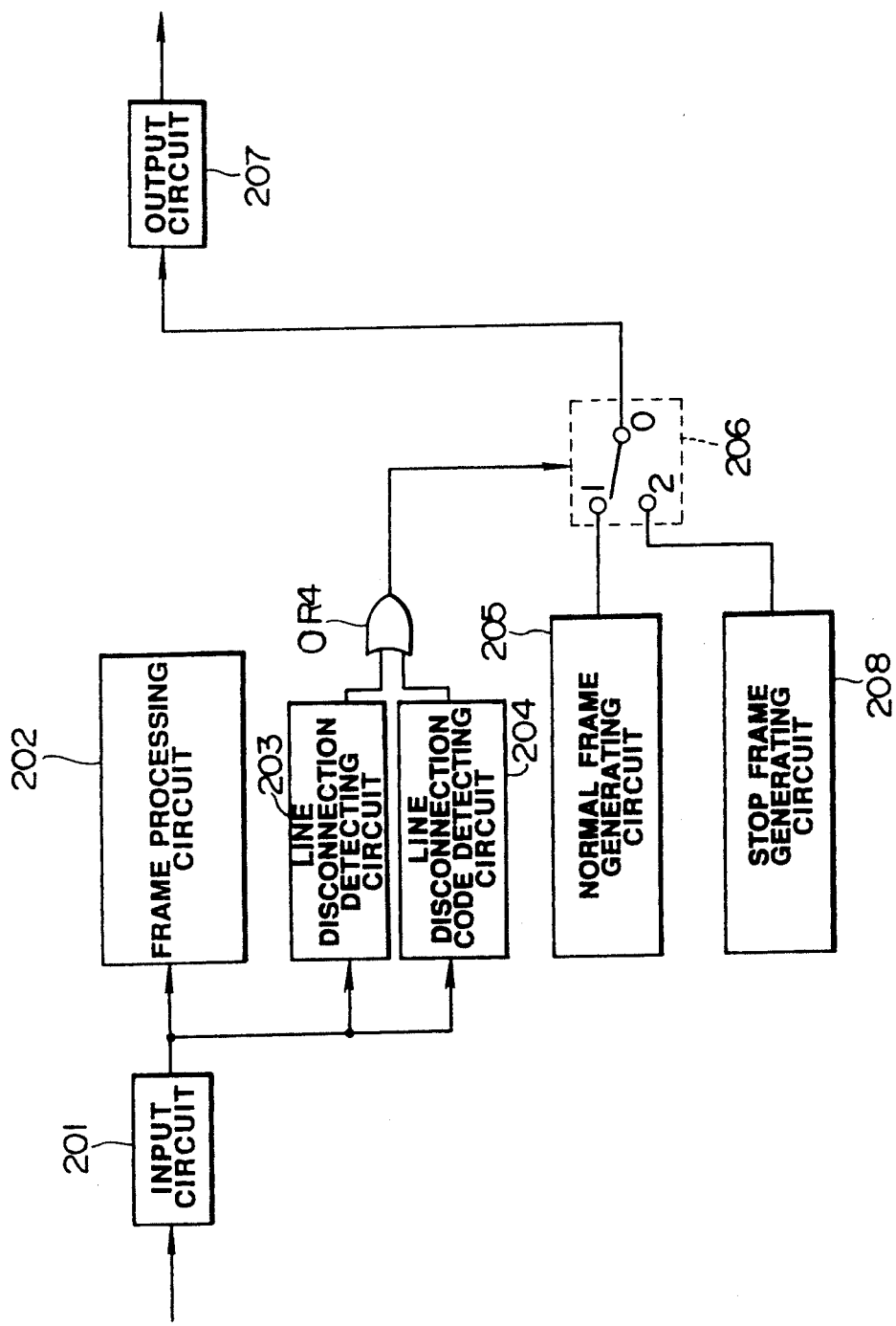
FIG. 12 is a block diagram which schematically illustrates by way of example a structure of the data extracting circuit in a main controller in accordance with the embodiment of the present invention in FIG. 10.

FIG. 12 is a block diagram which illustrates by way of example the inner structure of the main controller 2 in accordance with this embodiment of the present invention. With this structure of the main controller 2, a frame signal from the node 3 - n on the ultimate downstream side is received in an input circuit 201. In a case where the frame signal is modulated in the form of a CMI code or the like code and transmitted further, the input circuit 201 is constructed in a circuit structure such that the modulated frame signal is demodulated in the form of a NZR code. The demodulated frame signal is inputted into a frame processing circuit 202, a line disconnection detecting circuit 203 and a line disconnection code detecting circuit 204.

The frame processing circuit 202 operates in such a manner as to monitor the present state of all the nodes with reference to sensor output signals from all the nodes included in the demodulated frame signal, determine a control data row DATA for all the nodes to advance the process to a next step, generate a frame signal having a frame structure as shown in FIG. 9(a) in a normal frame generating circuit 205 and then input the frame signal into an output circuit 207 via a switch 206. The inputted frame signal is converted into a CMI code or the like code in the output circuit 207 and the converted frame signal is transmitted to the node 3 - 1 on the ultimate upstream side.

In a case where no frame signal is inputted into the line disconnection detecting circuit 203 from the node 3 - n on the ultimate downstream side for a period of time longer than a predetermined one, as is often the case where the line disconnection detecting circuit 332 operates for the nodes 3 - 1 to 3 - n in that way, the wire disconnection circuit 203 determines that the trouble of line disconnection takes place at a position between the node 3 - n and the main controller 2. Then, the line disconnection detecting circuit 203 generates a frame signal having a frame structure as shown in FIG. 9(d) in a stop frame generating circuit 208 so that the line disconnection detection signal is inputted into a switch 206 via an OR gate OR4 to shift the switch 206 to a position "2" where the frame signal is transferred further via the output circuit 207. The foregoing is equally applicable to a case where the line disconnection code detecting circuit 204 detects a frame signal including a line disconnection code BRK from the node 3 - n.

FIG. 13 illustrates a plurality of time charts which represent operations of each section at the time when a trouble of line disconnection takes place for some reason.

It should be noted that in place of a case where the control data row DATA for all the nodes is set to "0" to send a frame signal as shown in FIG. 9(d), an information having the same frame structure as that shown in FIG. 9(d) on a trouble of line disconnection may be generated and then delivered so as to allow a plurality of corresponding actuators upstream of a location where the line disconnection takes place to be actuated toward the safe side.

Figure 14:
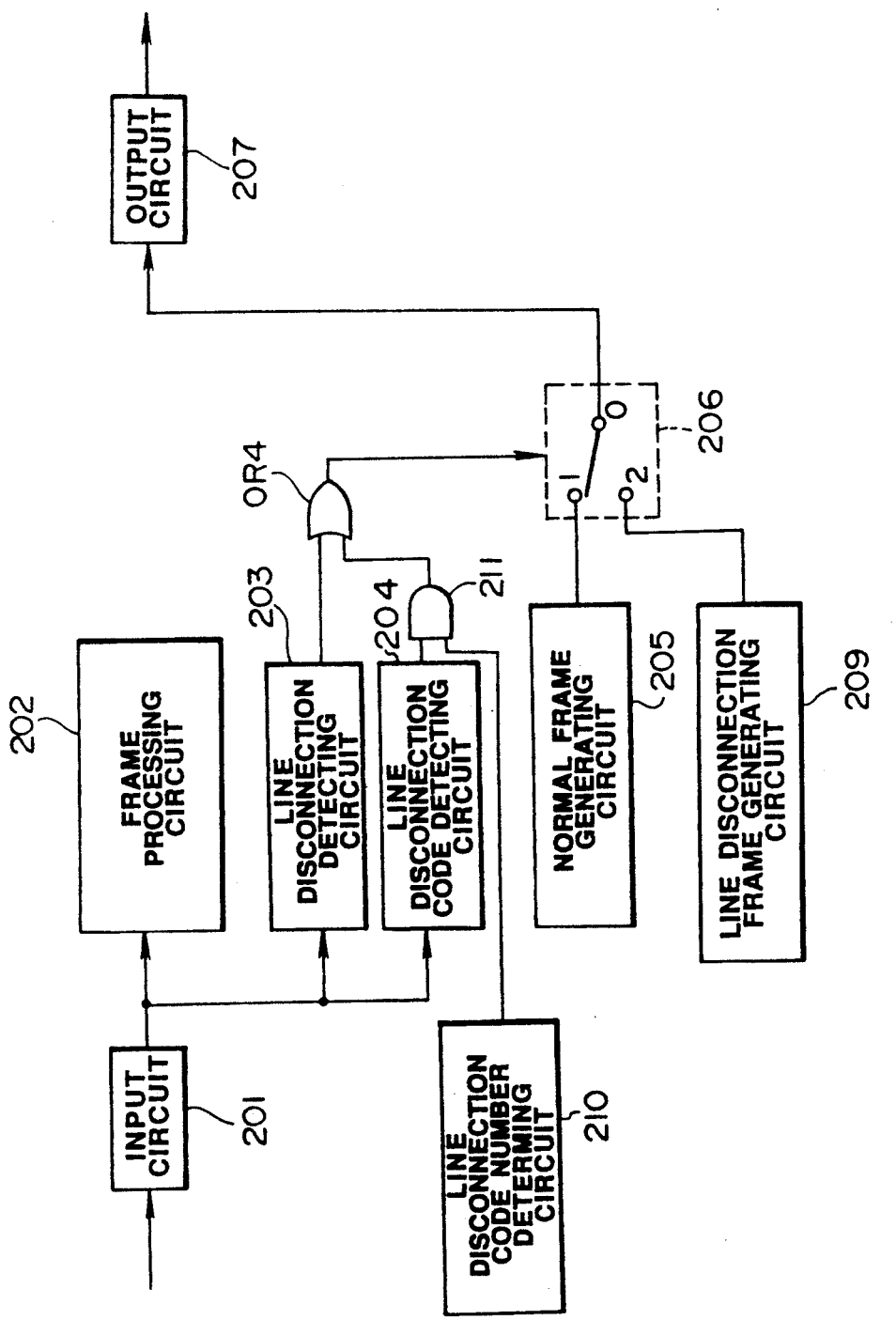
FIG. 14 is a block diagram which schematically illustrates by way of example other structure of the data extracting circuit in the main controller in accordance with the embodiment of the present invention in FIG. 10.

FIG. 14 is a block diagram which illustrates by way of example another structure of the main controller 2 which is constructed such that the information on line disconnection, as shown in FIG. 9(b), is generated and delivered. In this case, the main controller 2 is provided with a line disconnection frame generating circuit 209 which is substituted for the stop frame generating circuit 208 shown in FIG. 12. In addition, the main controller 2 is provided with a line disconnection code number determining circuit 210 which determines that a line disconnection position code is set lower than "n−1".

Figure 15:
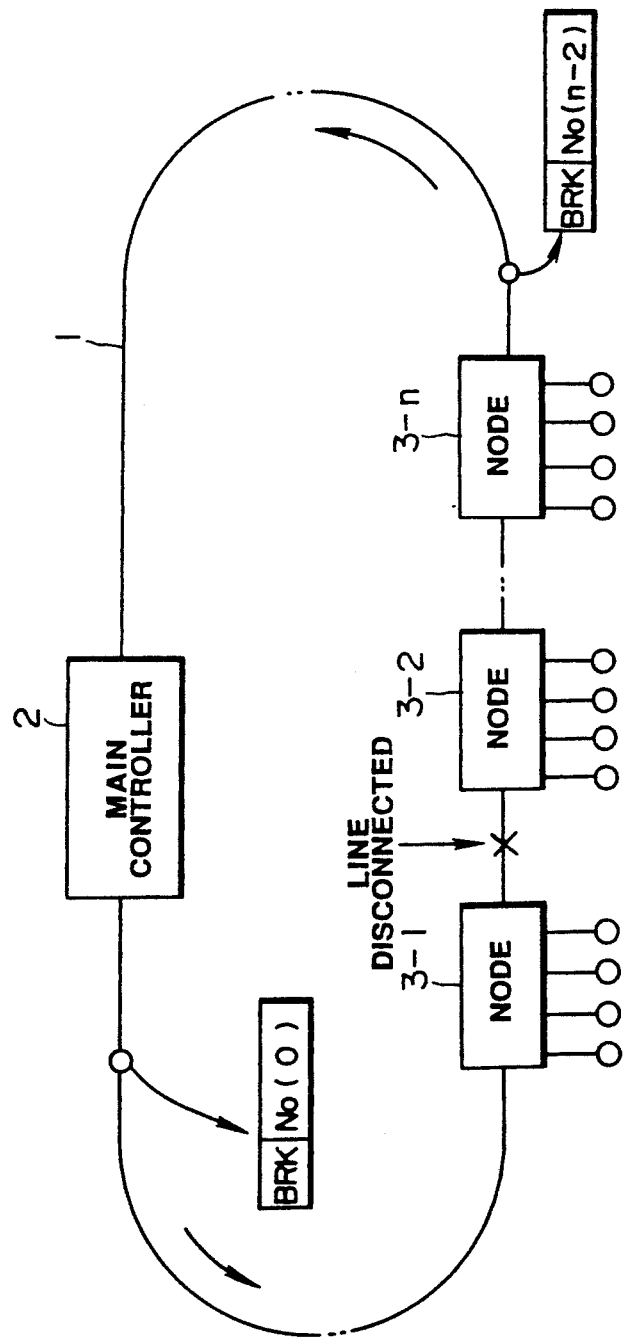
FIG. 15 and FIG. 16 are each a schematic view which particularly illustrates variation of an information on a trouble of line disconnection to be delivered from the data extracting circuit in the event of line disconnection as well as at the time when a repairing operation is performed for eliminating the trouble of line disconnection to return to a normal condition, respectively.
Figure 16:
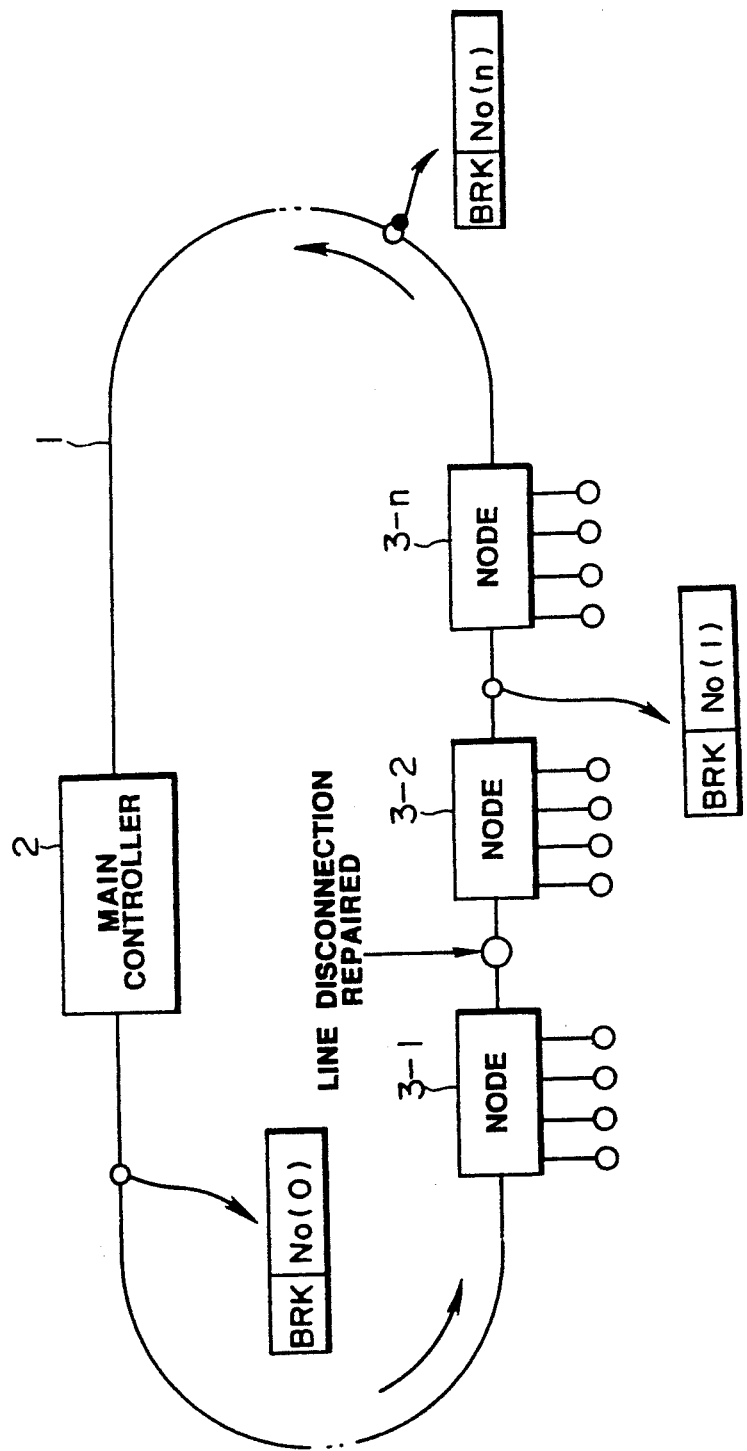

When it is assumed that the line disconnection takes place at a position between the node 3 - 1 and the node 3 - 2, a communication information representative of a line disconnection code n - 2 is inputted into the main controller 2 from the node 3 - n on the ultimate downstream side, as shown in FIG. 15. Then, the main controller 2 operates such that an information on the line disconnection represented by a line disconnection position code=0 is generated in the line disconnection frame generating circuit 209 and then delivered to the main controller 2 so as to allow a plurality of actuators A1 to Ak associated with the node 3 - 1 to be actuated toward the safe side, as shown in FIG. 15.

Thus, the actuators A1 to Ak associated with the node 3 - 1 are actuated toward the safe side until their actuation is stopped.

When the line disconnection which has taken place between the node 3 - 1 and the node 3 - 2 is repaired while the foregoing state is maintained so that a normal condition of the system is resumed, the information on the line disconnection transmitted from the main controller 2 returns to the main controller 2 via the nodes 3 - 1 to 3 - n. At this time, the main controller 2 updates the present line disconnection code to "n". As long as the line disconnected state is continuously maintained, the line disconnection position code representative of the trouble of line disconnection to be inputted into the main controller 2 is set lower than n−1 without fail. Then, the line disconnection code number determining circuit 210 determines that the present line disconnection position code is held lower than "n−1". Once the line disconnection code number determining circuit 210 has determined that the line disconnection code is held lower than "n−1", the main controller 2 recognizes that the trouble of line disconnection still remains at a certain position along the signal transmission line 1. Then, the main controller 2 opens an AND gate 211 disposed between a line disconnection code detecting circuit 204 and an OR gate OR4 shifts a switch 206 to a position "2" and sends from an output circuit 207 the information on the line disconnection which has been generated in the line disconnection frame generating circuit 209.

In a case where the line disconnection position code is identified by "n", an information on the line disconnection which has been sent from the present node is unavoidably brought back to the present node. In this case, the main controller 2 recognizes that the line disconnection is properly repaired to assume a correct condition and then closes the AND gate 211 so that delivery of the information on the now repaired line is stopped.

FIG. 17 shows a plurality of time charts which illustrate operations to be performed by the respective circuits associated with the main controller shown in FIG. 14, respectively.

Each of the aforementioned embodiments has been described as to a case where delivery of a driving signal to a plurality of actuators A1 to Ak is interrupted in the event of line disconnection. However, with respect to actuators of which safety side is held in a driving state, it should of course be understood that they may be constructed such that they are brought in a continuous driving state in the event of line disconnection. To this end, an OR gate needs to be substituted for the gate 338 (see FIG. 10).

In addition, the embodiment shown in FIG. 9 to FIG. 17 of course may arbitrarily be combined with the embodiment shown in FIG. 3 to FIG. 5 or the embodiment shown in FIG. 6 to FIG. 8. Such combination as mentioned above assures that a safe operation of the serial control apparatus is reliably maintained no matter what operative state is assumed by the serial control apparatus.

INDUSTRIAL APPLICABILITY

As will be apparent from the above description, according to the present invention, the data extracting circuit can reliably prevent erroneous data of which occurrence is anticipated with the serial control apparatus from being received in the serial control apparatus. In addition, the data extracting circuit can reliably prevent the serial control apparatus itself and objects to be controlled from being undesirably damaged or injured due to an incorrect operation of the whole system. Thus, employment of the data extracting circuit of the present invention assures that a serial control apparatus having a high reliability can be realized.

We claim:

1. A data extracting circuit employable for a serial control apparatus including a main controller and a plurality of nodes each serving as an auxiliary controller, said main controller and said nodes being serially connected in a loop-shaped configuration or in a daisy chain-shaped configuration by a signal transmission line, said serial control apparatus being provided with at least one of time serial data including control data repeatedly periodically transmitted from said main controller to all nodes serially connected to said main controller via said signal transmission line and time serial data including sensing data repeatedly periodically transmitted from a specific one of said plurality of nodes to said main controller and all nodes serially connected to said specific node via said signal transmission line, said data extracting circuit being disposed in said main controller and in each of said plurality of nodes and serving to extract a data history with respect to said time serial data being repeatedly periodically transmitted, said data extracting circuit comprising:

extracting means for extracting data in a specific time slot of said time series data, first latching means for latching said extracted data as new data each time said extracting means extracts data, second latching means for latching as old data the data latched by said first latching means in response to subsequent transmissions of said time series data, controlling means for controlling a terminal unit in response to the data latched by said second latching means, detecting means for detecting from said time series data presence or absence of an error and presence or absence of an error history representing that an error is present in said time series data, and inhibiting means for inhibiting data from being latched by said second latching means when at least one of the error and the error history is detected by said detecting means.

2. A data extracting circuit employable for a serial control apparatus as claimed in claim 1, wherein said second latching means comprises a shift register having a plurality of stages constituting a plurality of serially connected latching means for shifting said old data from said first latching means sequentially from one stage to a next stage of said plurality of stages each time said time series data are transmitted and for respectively latching the data being shifted, and wherein said data extracting circuit further includes;

comparing means for simultaneously comparing contents of the respective stages of said shift register constituting said second latching means with each other and outputting a coincidence signal when all the contents coincide with each other, and maintaining means for maintaining contents of the data inputted from said second latching means to said controlling means until said coincidence signal is outputted from the comparing means.

3. A data extracting circuit employable for a serial control apparatus as claimed in claim 1, further including;

comparing means for comparing contents of data latched by said first and second latching means with each other and outputting a coincidence signal when said contents of the latched data coincide with each other, counting means for counting the number of coincidence signals each time said coincidence signal is outputted from said comparing means, and determination controlling means for allowing the data being latched in said second latching means to be inputted into said controlling means when the count value counted in said counting means reaches a predetermined value and initializing the count value counted in said counting means.

4. A data extracting circuit employable for a serial control apparatus as claimed in claim 3, wherein said determination controlling means further includes;

first count controlling means for controlling to reset said count value counted in said counting means so as to forcibly set a first count value when the contents of data latched in said first latching means are different from the contents of data latched in said second latching means.

5. A data extracting circuit employable for a serial control apparatus as claimed in claim 4, wherein said determination controlling means further includes;
   second count controlling means for controlling to reserve said count value counted in said counting means when at least one of the error and the error history is detected by said detecting means.

6. A data extracting circuit employable for a serial control apparatus as claimed in claim 1, wherein said main controller and said plurality of nodes are serially connected in the loop-shaped configuration, wherein
   each of said nodes includes;
   means for extracting data relative to one node among from the time serial data transmitted from said main controller,
   means for controlling a terminal unit connected to the one node, and
   means for sending data outputted from said terminal unit by inserting said output data into a time slot assigned to the one node to said main controller via other nodes located on a downstream side with respect to a data transmission direction, and wherein
   each of said data extracting means in said main controller and each node includes;
   line disconnection detecting means for detecting that a trouble of line disconnection takes place on said signal transmission line,
   informing means for generating information on the trouble of line disconnection in response to a line disconnection detecting signal from said line disconnection detecting means to inform that the trouble takes place on said signal transmission line, said informing means in each node informing said main controller via nodes located on the downstream side with respect to the data transmission direction of the trouble of line disconnection and said informing means in said main controller informing nodes located on an upstream side with respect to the data transmission direction of a location where the trouble of line disconnection has taken place via a part of the signal transmission line without any line disconnection caused thereon, and
   line disconnection controlling means for forcibly actuating toward a safe side said terminal unit toward a previously set fail-safe side on the basis of at least either one of conditions when said line disconnection detecting signal is outputted from the line disconnection detecting means and when said information on the trouble of line disconnection delivered from nodes located on the upstream side with respect to the data transmission direction is received by said line disconnection controlling means.

7. A data extracting circuit employable for a serial control apparatus as claimed in claim 1, wherein said main controller and said plurality of nodes are serially connected in the loop-shaped configuration, wherein
   each of said nodes includes;
   means for extracting data relative to one node among from the time serial data transmitted from said main controller,
   means for controlling a terminal unit connected to the one node, and
   means for sending data outputted from said terminal unit by inserting said output data into a time slot assigned to the one node to transmit said data to said signal transmission line and main controller via other nodes located on downstream side with respect to a data transmission direction, and wherein
   each of said data extracting means in said main controller and each node includes;
   line disconnection detecting means for detecting that a line disconnection has taken place on said signal transmission line,
   informing means for generating information on the line disconnection in response to a line disconnection detecting signal from said line disconnection detecting means to inform that the line disconnection has taken place on said signal transmission line, said informing means in each node informing said main controller via nodes located on the downstream side with respect to the data transmission direction of the line disconnection and said informing means in said main controller informing nodes located on an upstream side with respect to the data transmission direction of a location where the line disconnection has taken place via a part of the signal transmission line without any line disconnection caused thereon, and
   line disconnection controlling means for controlling to forcibly drive said inhibiting means on the basis of at least either one of conditions when said line disconnection detecting signal is outputted from the line disconnection detecting means and when said information of the line disconnection delivered from nodes located on the upstream side with respect to the data transmission direction is received by said line disconnection controlling means.

* * * * *